(12) United States Patent
Hiruma

(10) Patent No.: US 7,215,406 B2
(45) Date of Patent: May 8, 2007

(54) DEVICE FOR ARRANGING LIQUID DROPS, ELECTRO-OPTICAL PANEL, ELECTRO-OPTICAL DEVICE, ELECTRONIC APPARATUS, METHOD OF ARRANGING LIQUID DROPS, METHOD OF MANUFACTURING ELECTRO-OPTICAL PANEL, AND METHOD OF MANUFACTURING ELECTRONIC APPARATUS

(75) Inventor: Kei Hiruma, Chino (JP)

(73) Assignee: Seiko Epson Corporation (JP)

( * ) Notice: Subject to any disclaimer, the term of this patent is extended or adjusted under 35 U.S.C. 154(b) by 156 days.

(21) Appl. No.: 10/850,837

(22) Filed: May 19, 2004

(65) Prior Publication Data

US 2005/0018125 A1    Jan. 27, 2005

(30) Foreign Application Priority Data

May 20, 2003 (JP) .............................. 2003-142045

(51) Int. Cl.
*G02F 1/1333* (2006.01)
*G02F 1/13* (2006.01)

(52) U.S. Cl. ..................... 349/187; 349/154; 349/90

(58) Field of Classification Search ................. 349/154, 349/189; 347/80
See application file for complete search history.

(56) References Cited

U.S. PATENT DOCUMENTS 6,953,238 B2 * 10/2005 Koitabashi et al. ........... 347/43

6,994,414 B2 *  2/2006 Hashimoto et al. ........... 347/19
2004/0207800 A1 * 10/2004 Hiruma et al. ............... 349/189

FOREIGN PATENT DOCUMENTS

| JP | 05-281562 |   | 10/1993 |
| JP | 09-138410 |   | 5/1997  |
| JP | 11190804  | * | 7/1999  |
| JP | 2003-280535 | * | 2/2003 |
| JP | 2003-133691 |   | 9/2003 |

* cited by examiner

*Primary Examiner*—Huyen Ngo
(74) *Attorney, Agent, or Firm*—Harness, Dickey & Pierce, P.L.C.

(57) ABSTRACT

A liquid drop arranging device is provided for arranging liquid drops made of liquid crystal on a substrate. The liquid drops are arranged so that adjacent liquid drops reach the substrate with a first pitch equal to or less than the diameter of the liquid drops immediately before reaching the substrate. When the diameter of the liquid drops at the moment the liquid drops reach the substrate is the first diameter and the diameter of the liquid drops at the moment the liquid drops spread from the first diameter is a second diameter that is larger than the first diameter, the liquid drops are arranged so that the entire outline of a liquid drop of the first diameter contacts a liquid drop of the first diameter adjacent to the liquid drop when the liquid drops reach the substrate.

3 Claims, 25 Drawing Sheets

[FIG. 1]
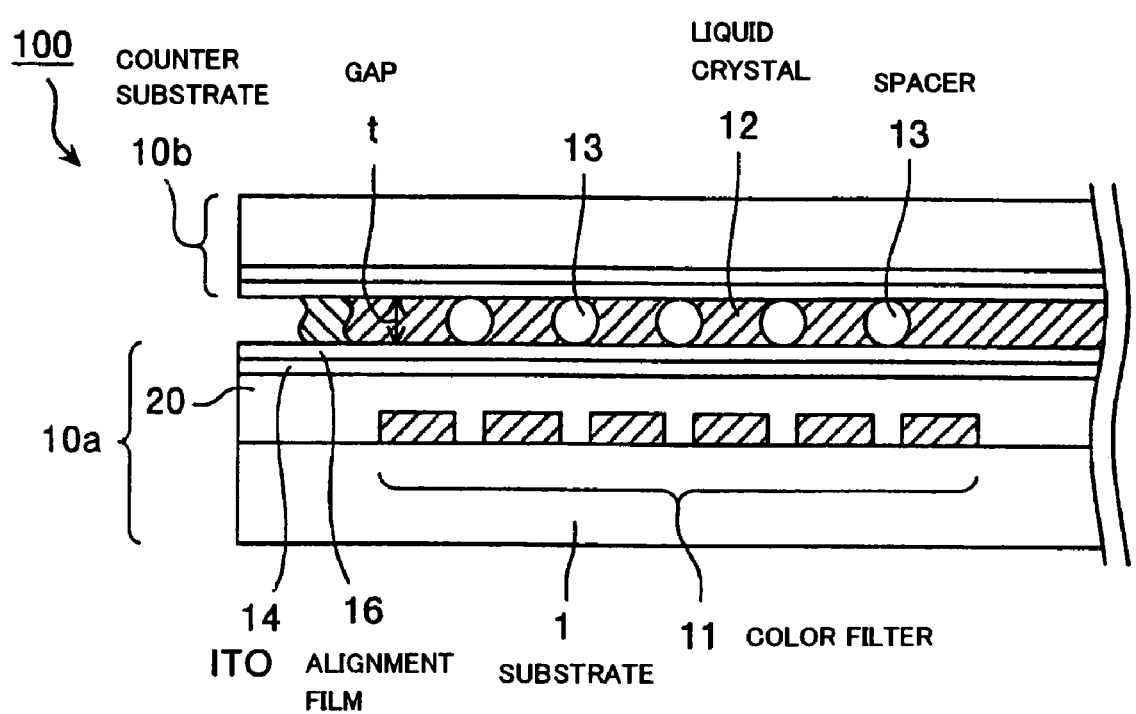

[FIG. 2a]
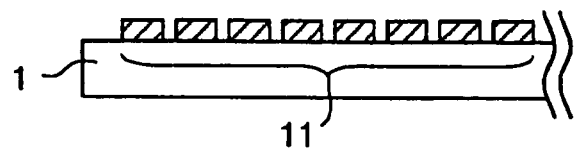
[FIG. 2b]
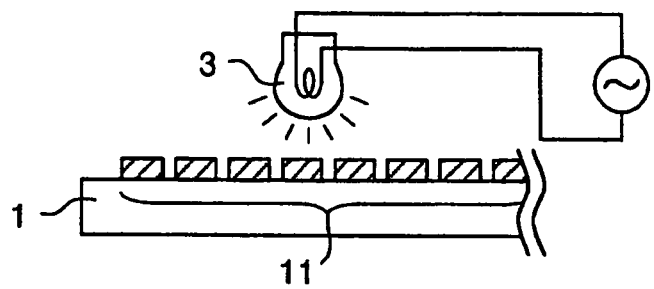
[FIG. 2c]
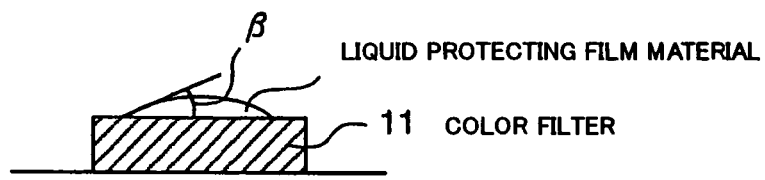
LIQUID PROTECTING FILM MATERIAL
11 COLOR FILTER
[FIG. 2d]
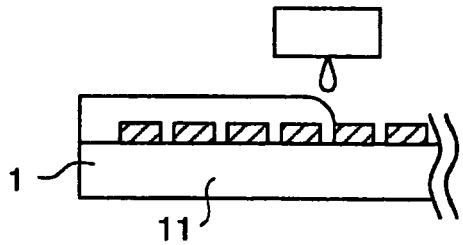
[FIG. 2e]
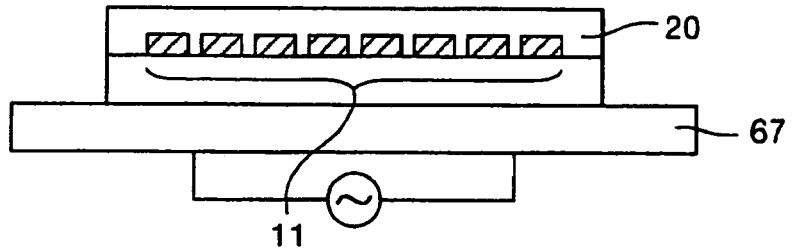

[FIG. 3f]
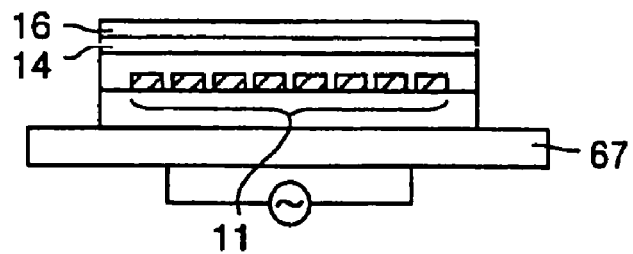
[FIG. 3g]
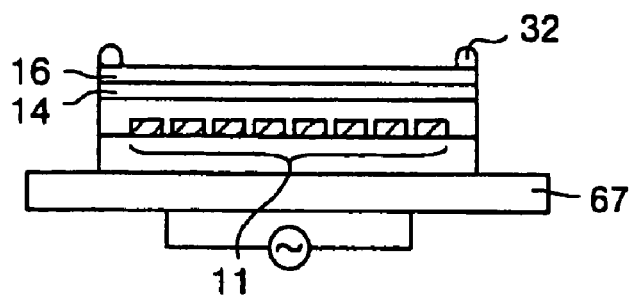
[FIG. 3h]
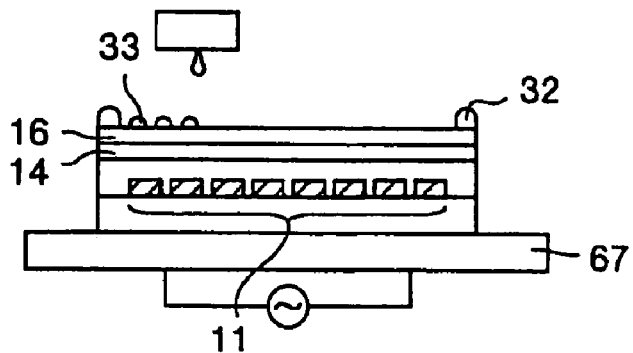
[FIG. 3i]
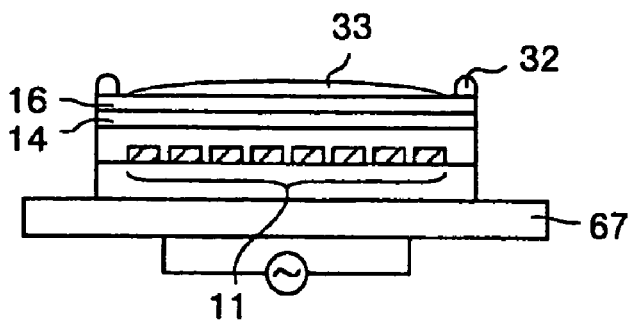
[FIG. 3j]
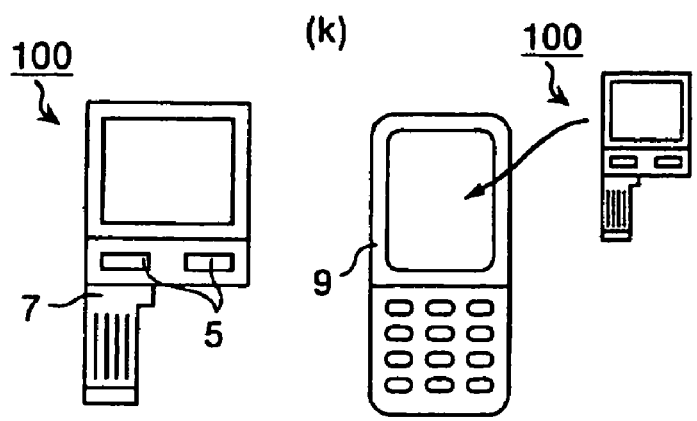

[FIG. 4]
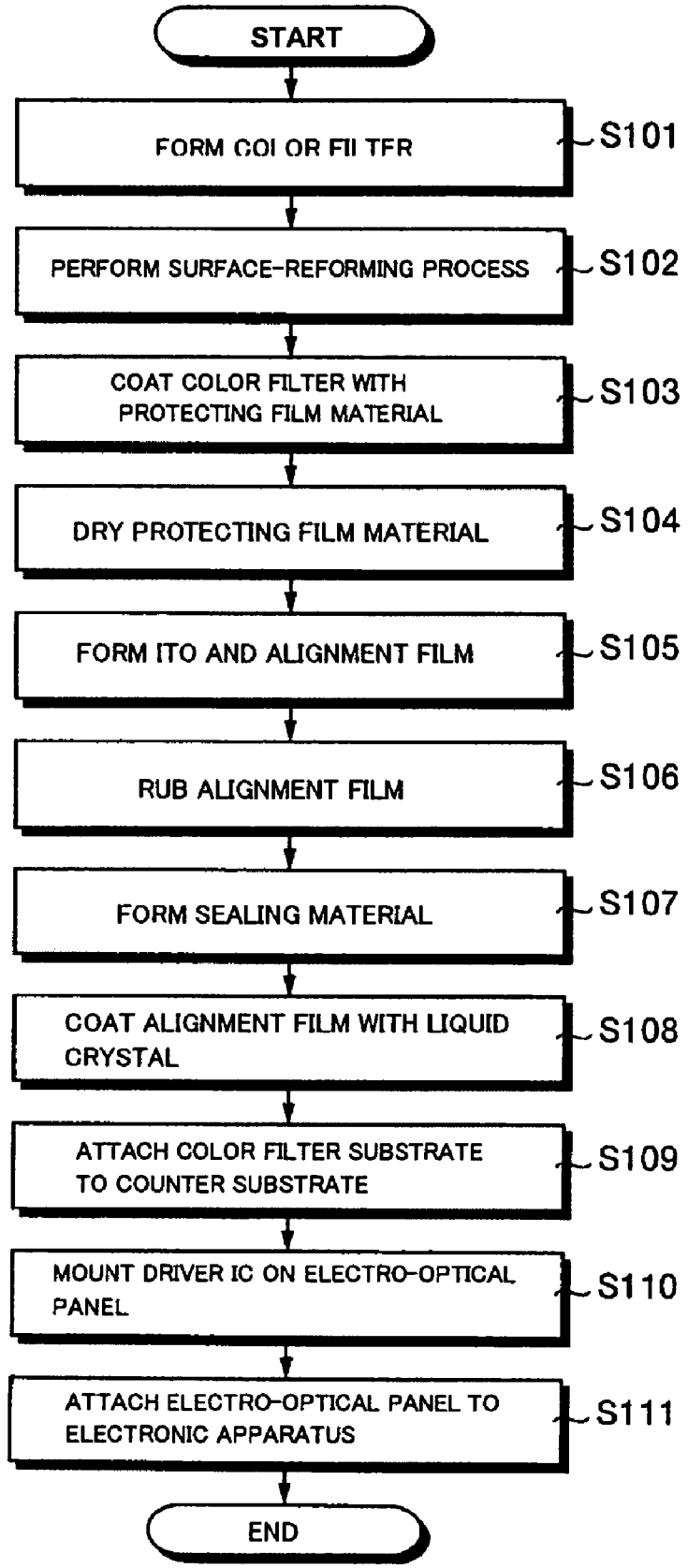

[FIG. 5a]
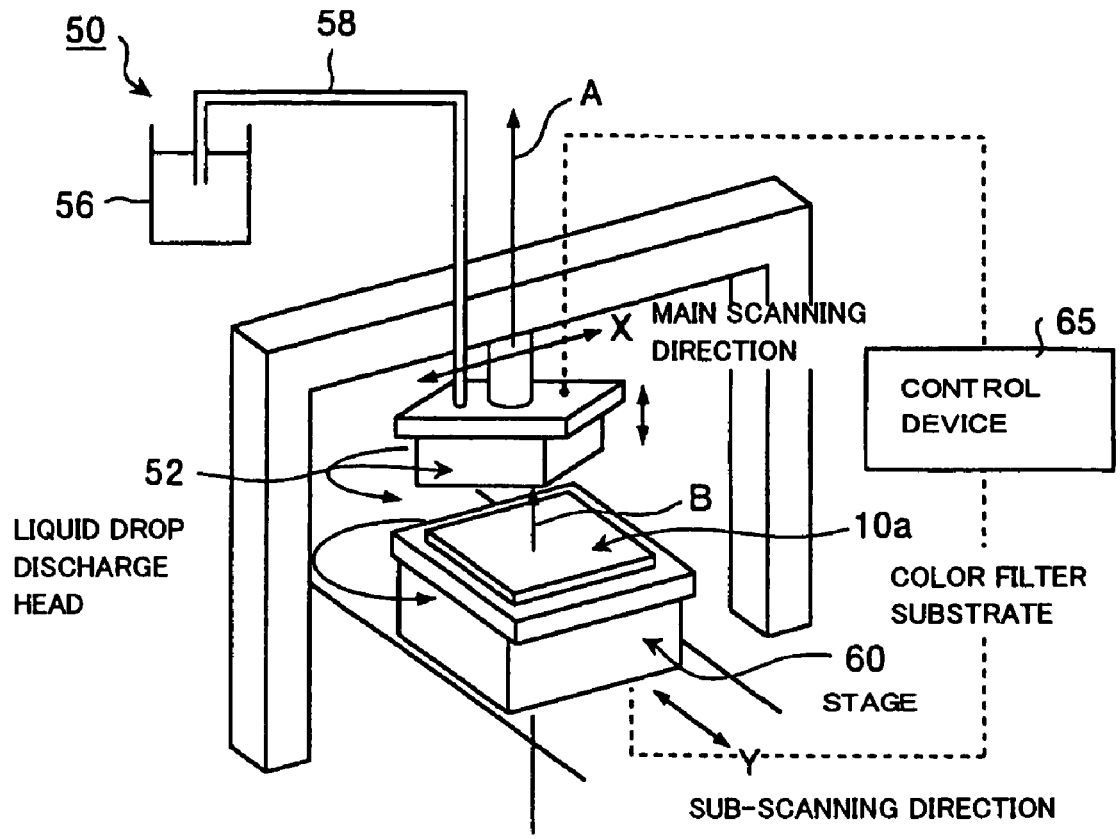
[FIG. 5b]
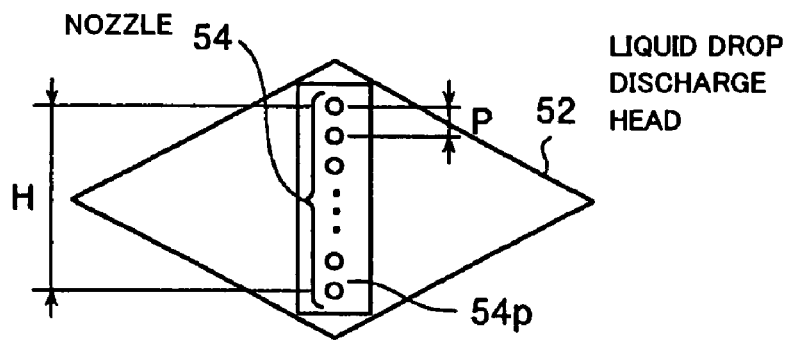
[FIG. 5c]
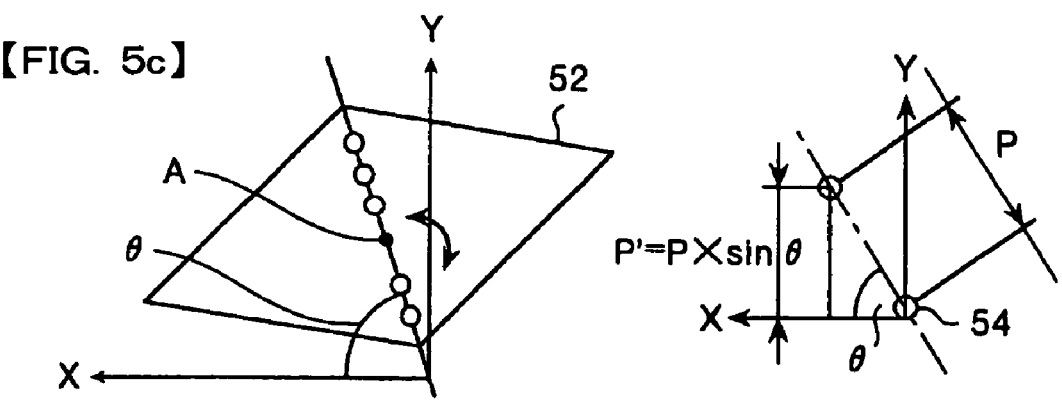

【FIG. 6】
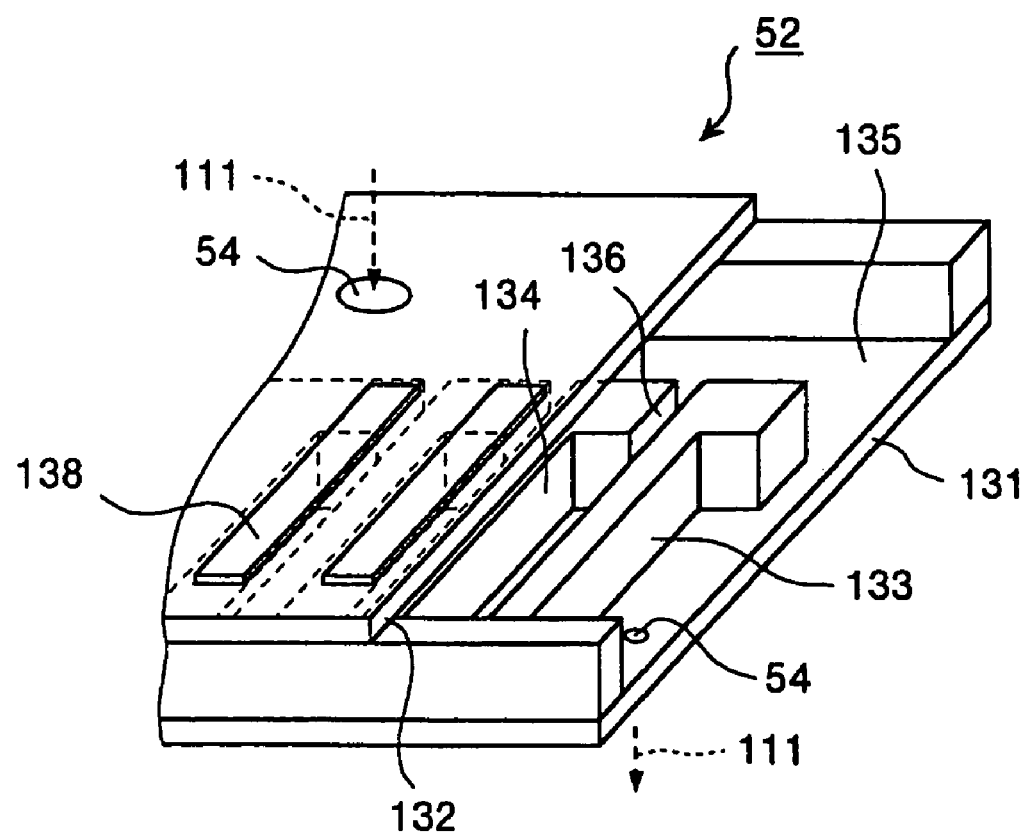

[FIG. 7]
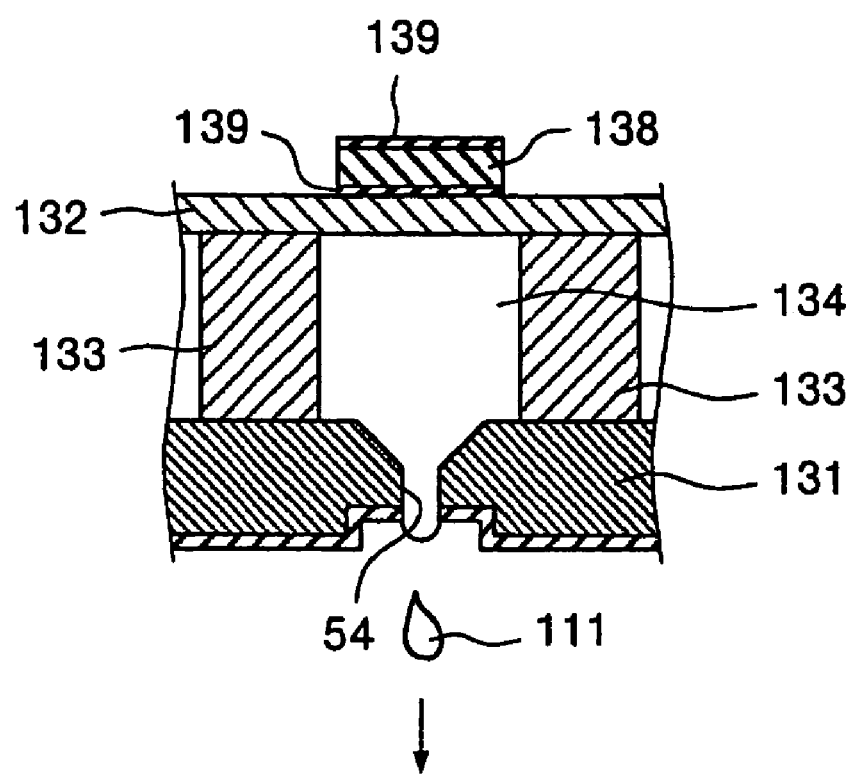

[FIG. 8]
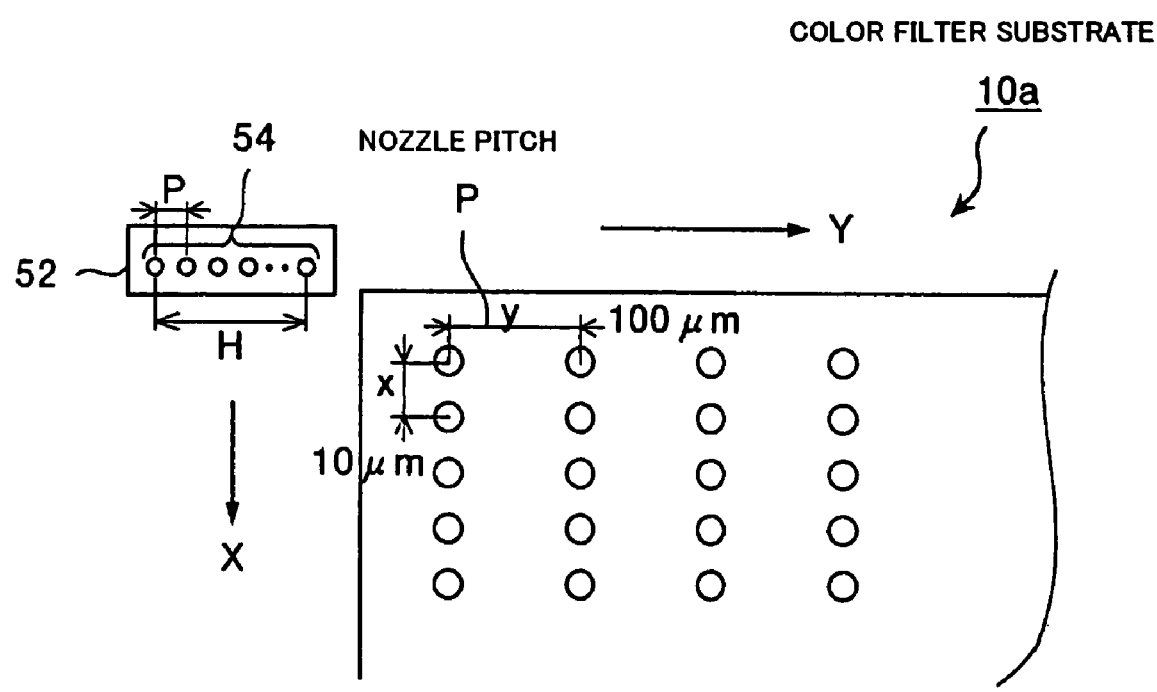

[FIG. 9]
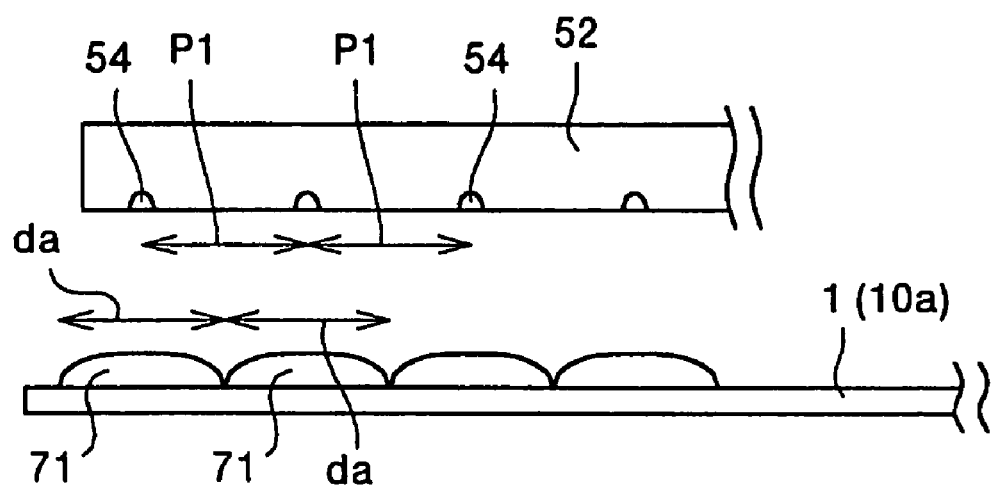

[FIG. 10]
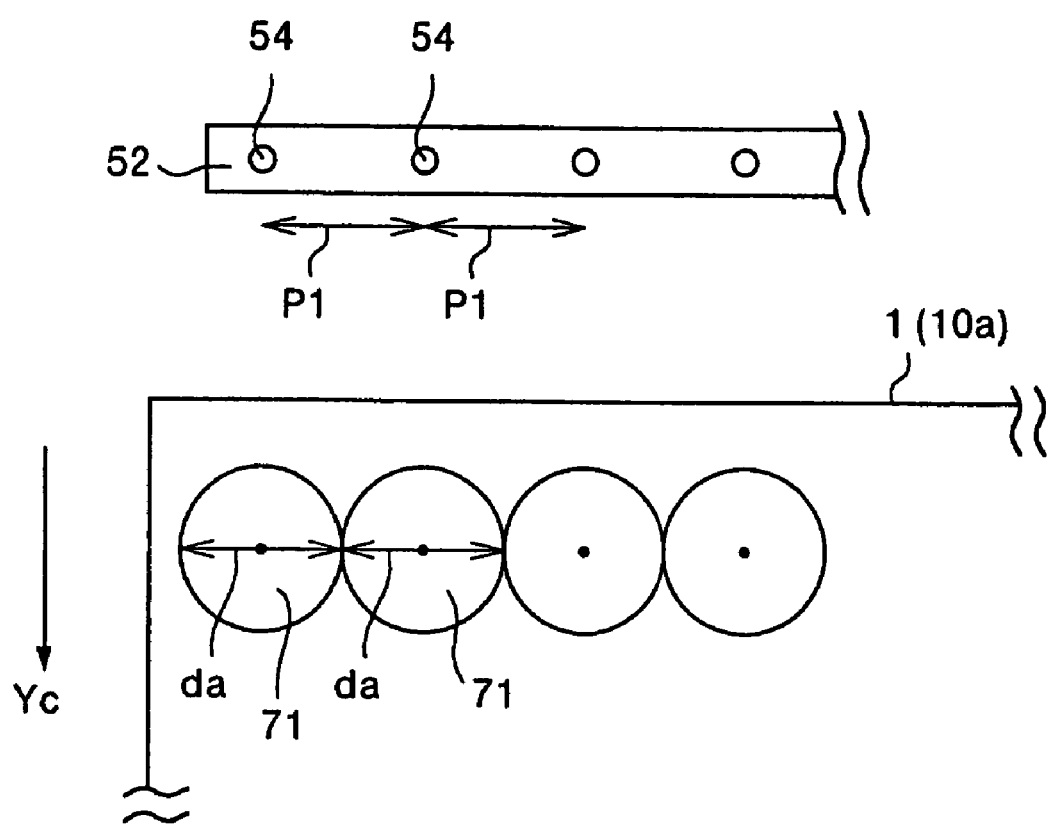

[FIG. 11]
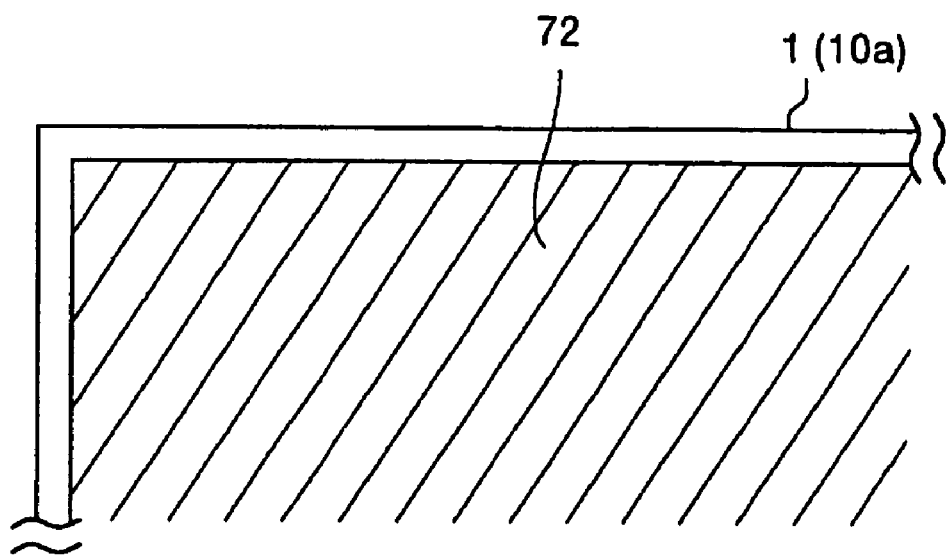

[FIG. 13]
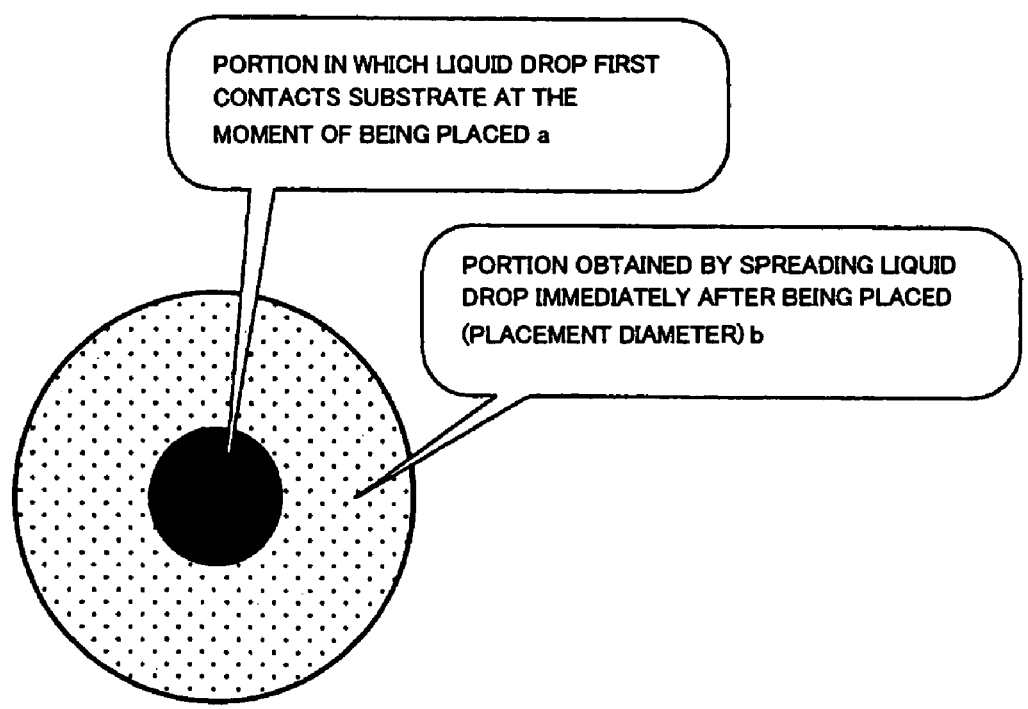

[FIG. 14]
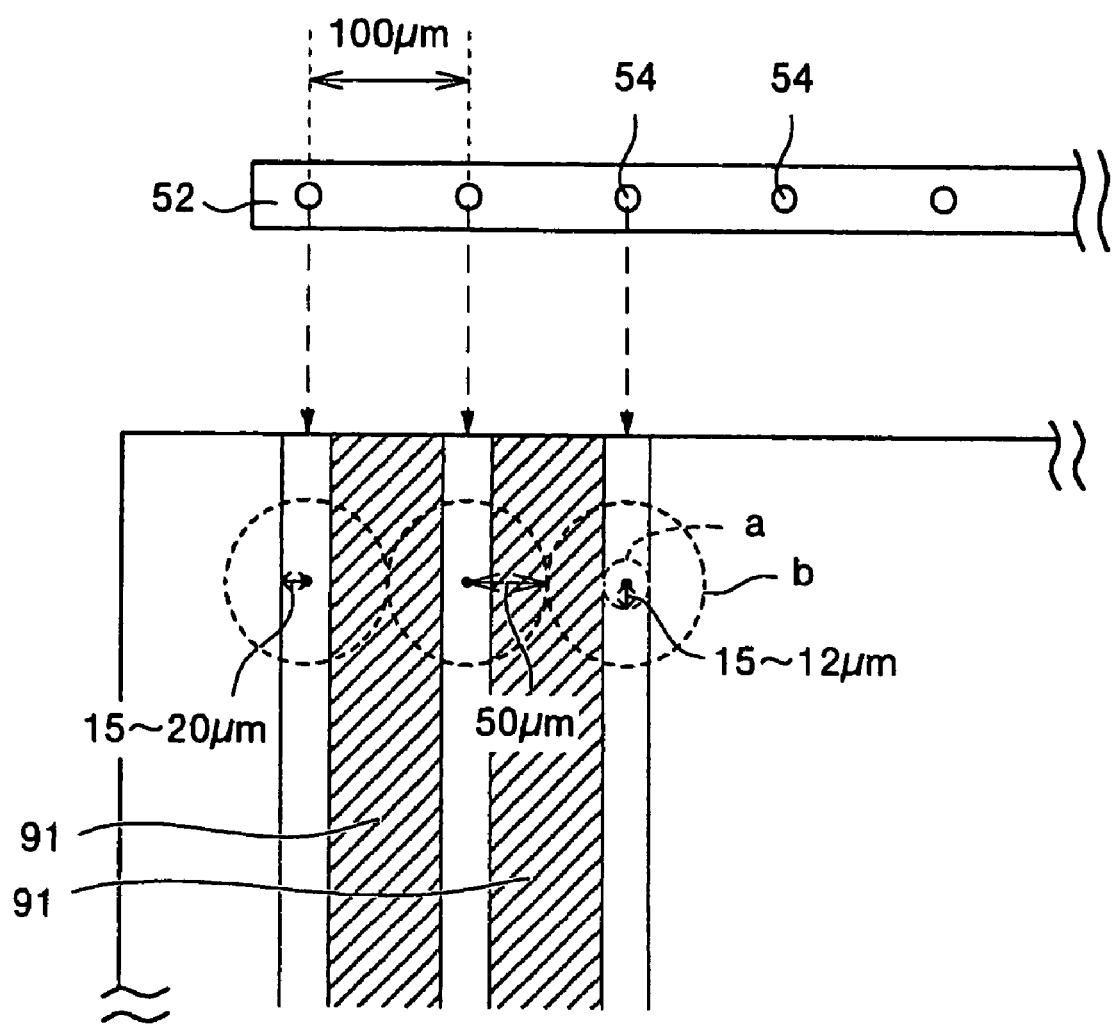

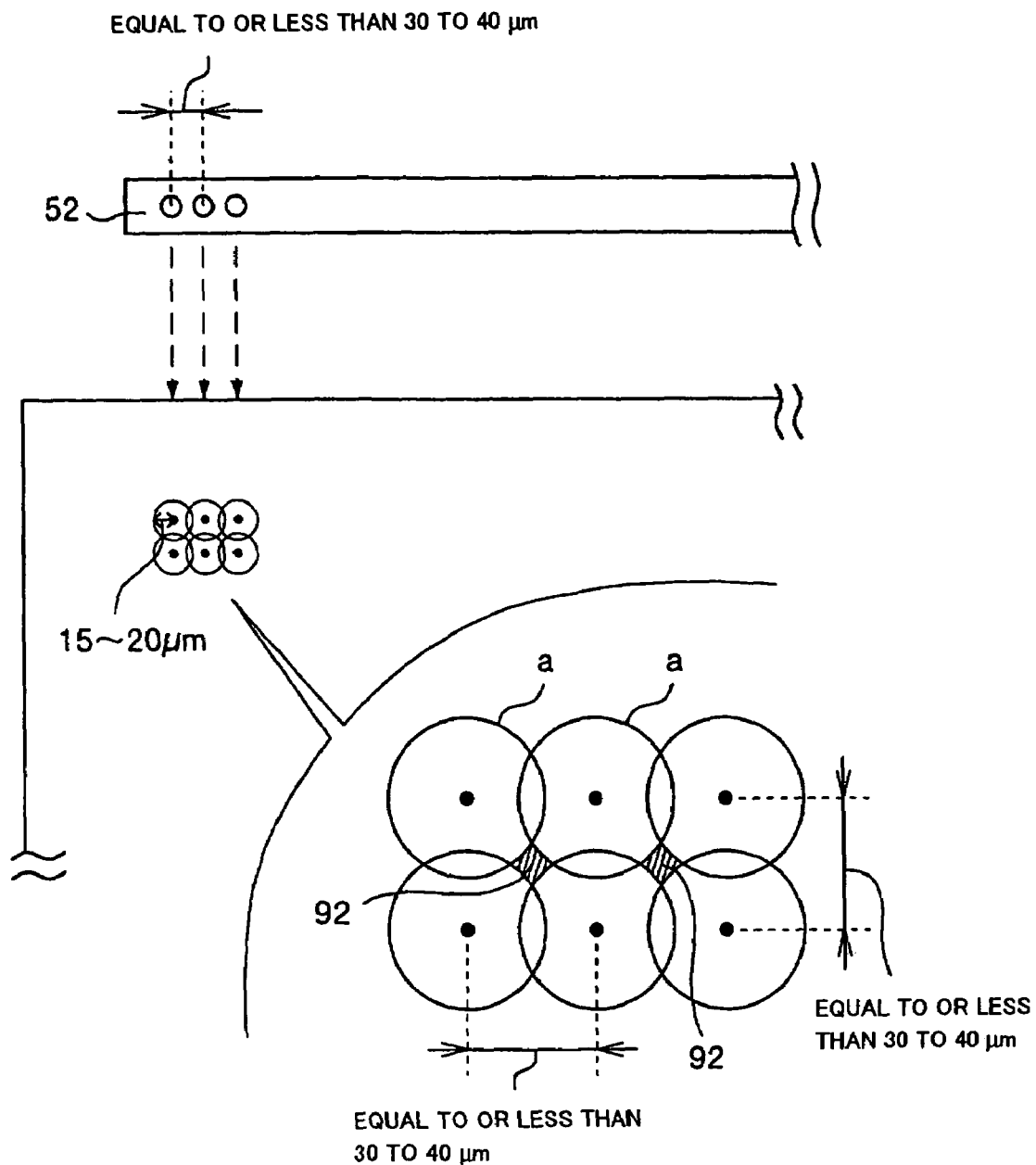
[FIG. 15]

[FIG. 16]
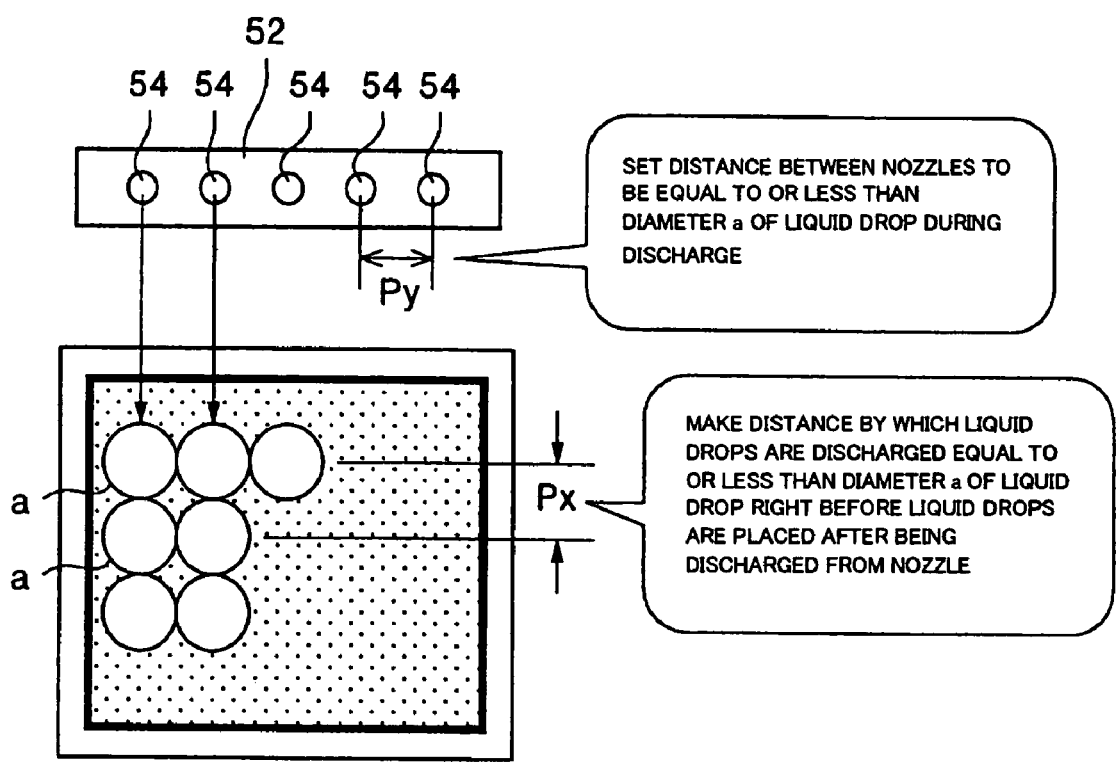

[FIG. 17]
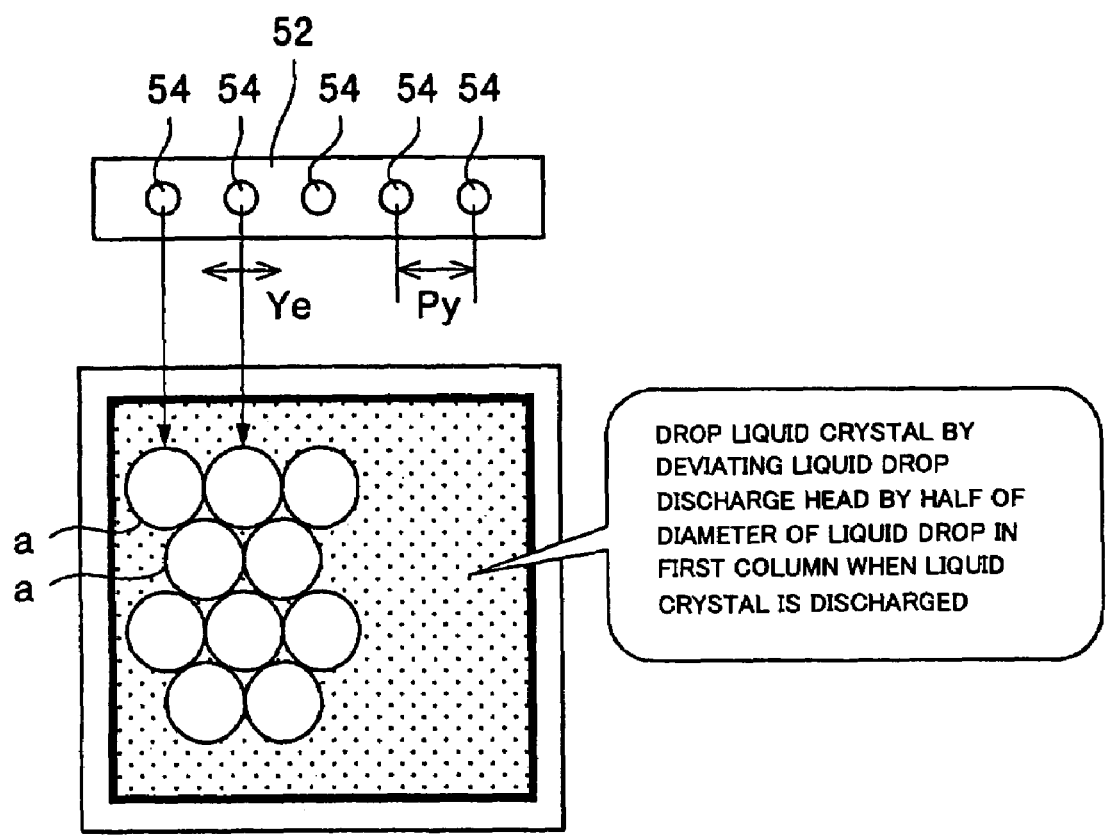

[FIG. 18]
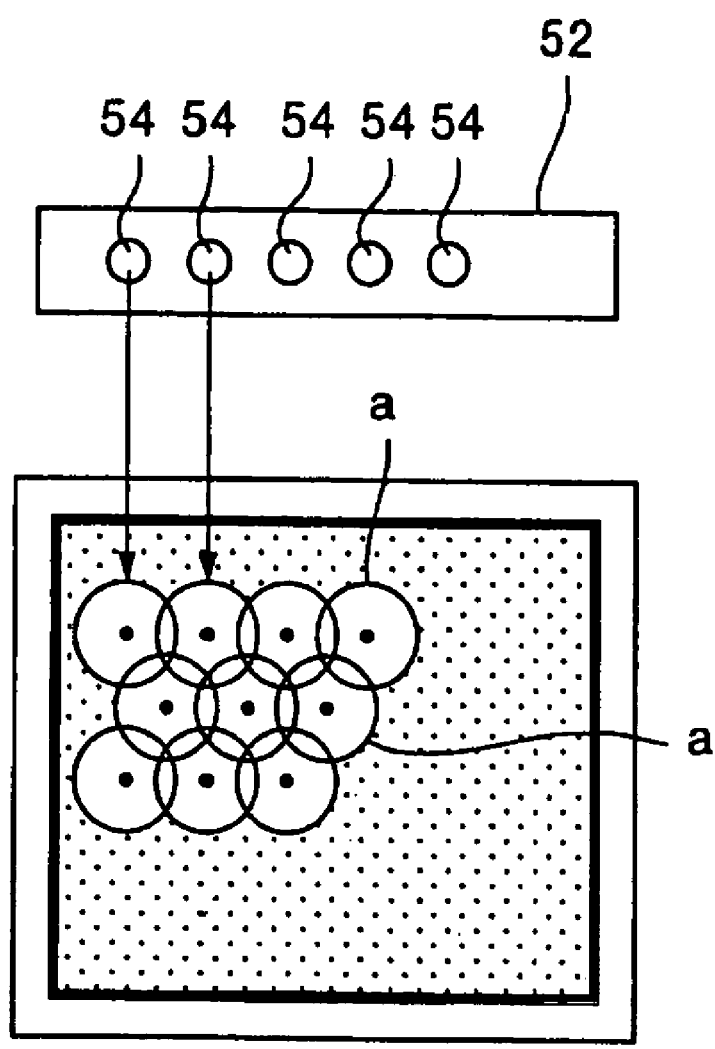

[FIG. 19]
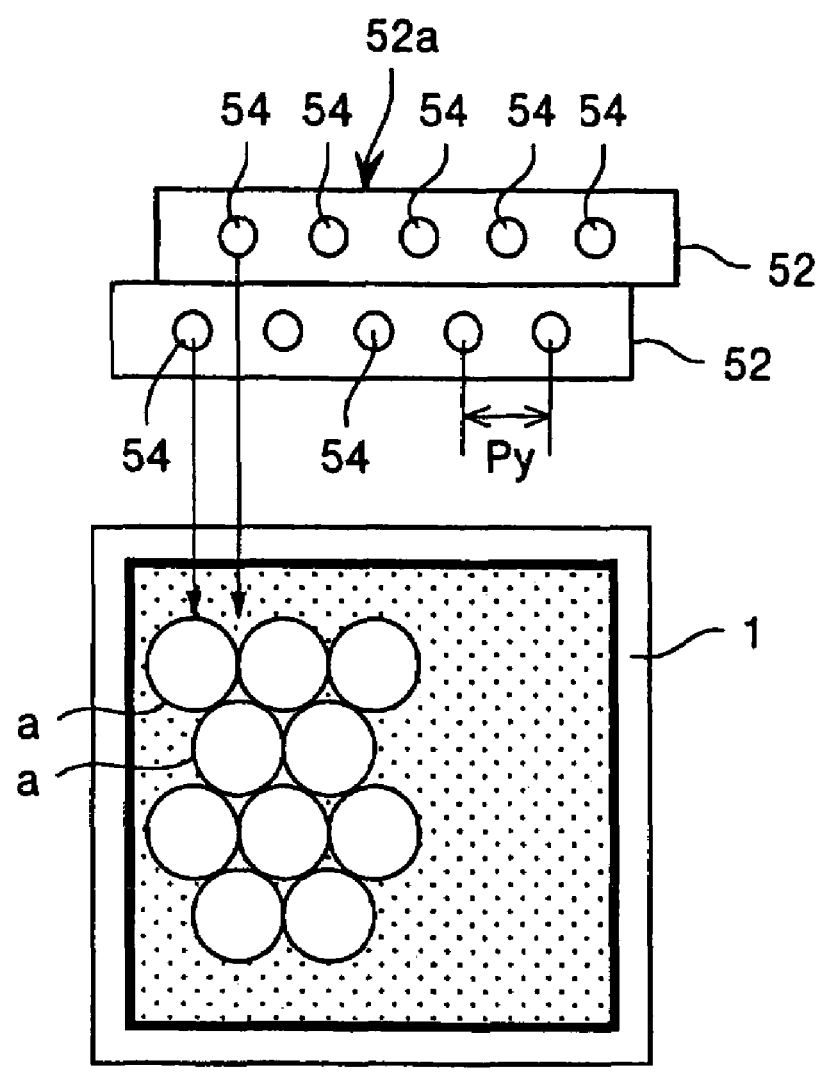

[FIG. 20]
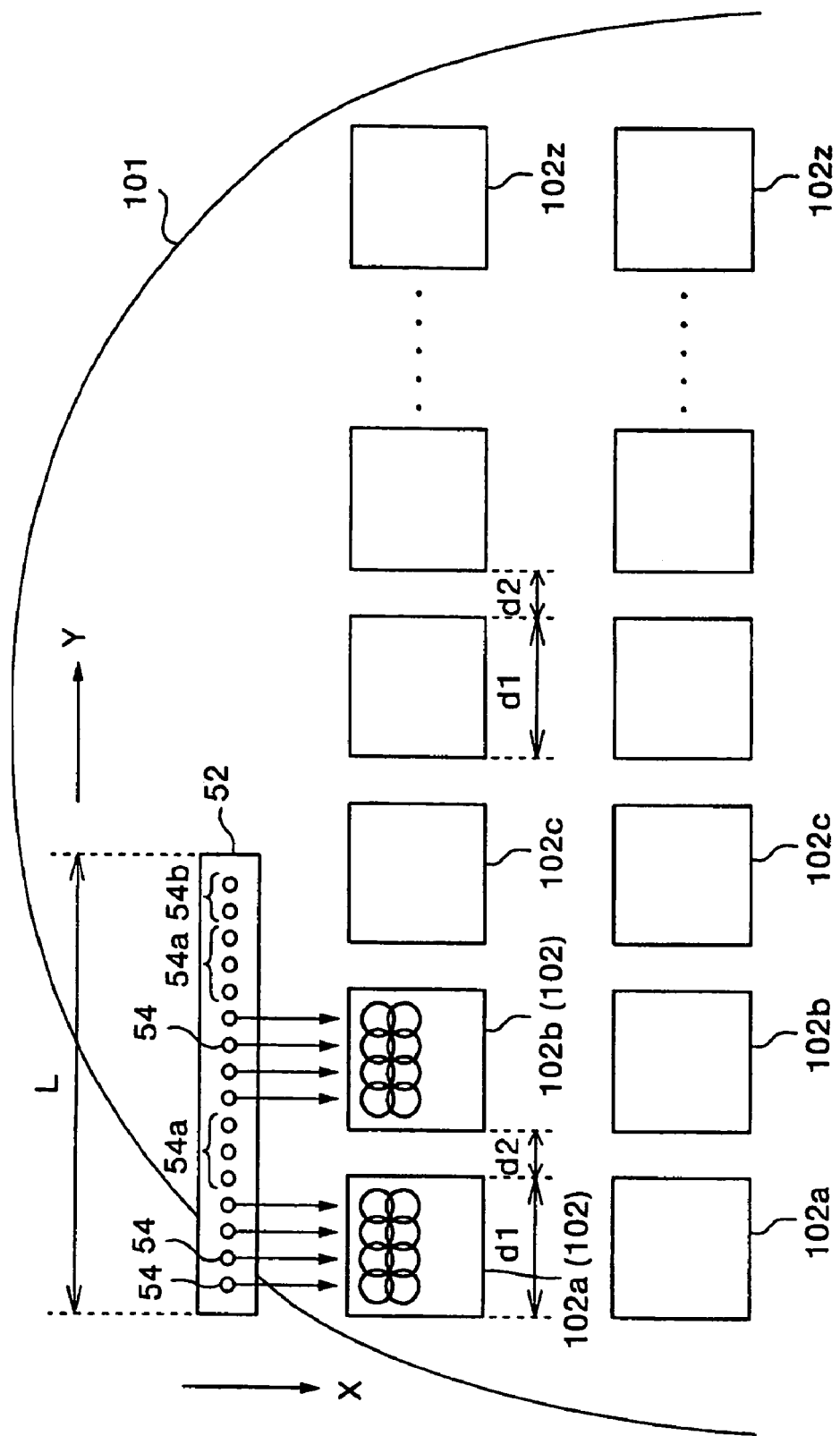

[FIG. 21]
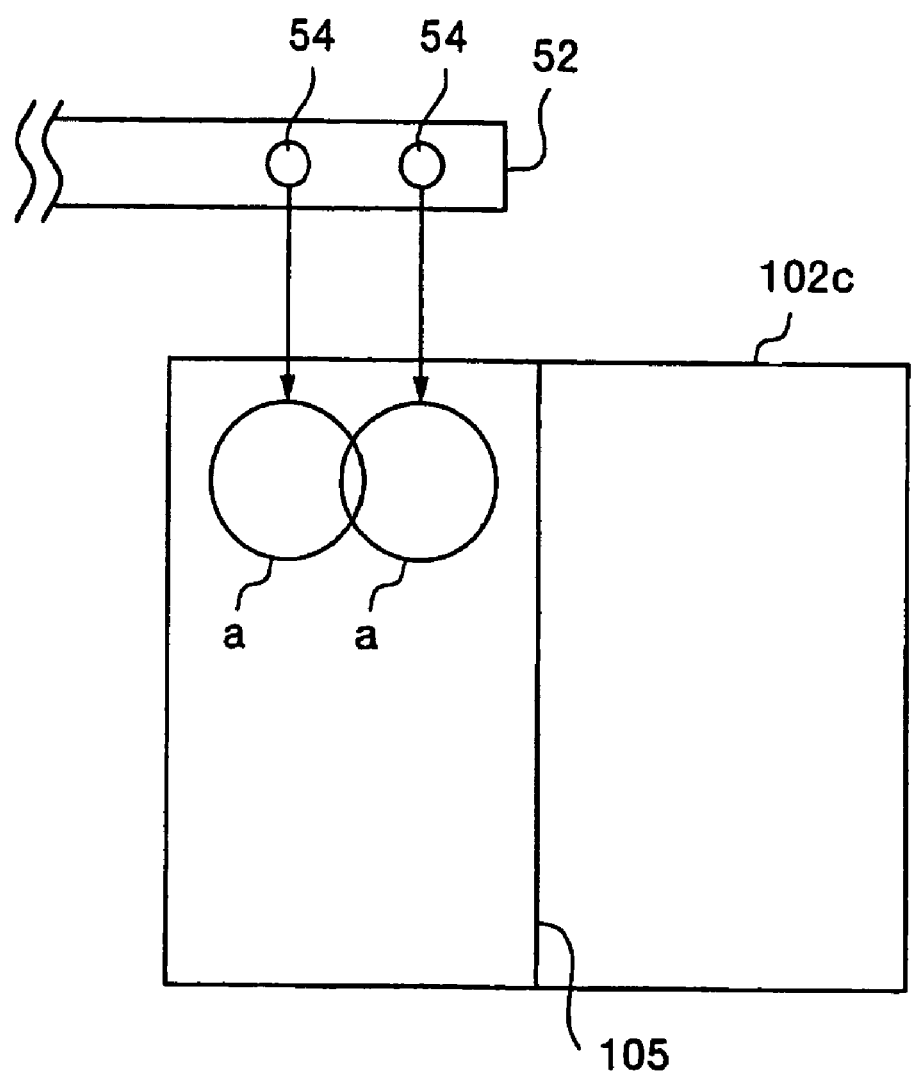

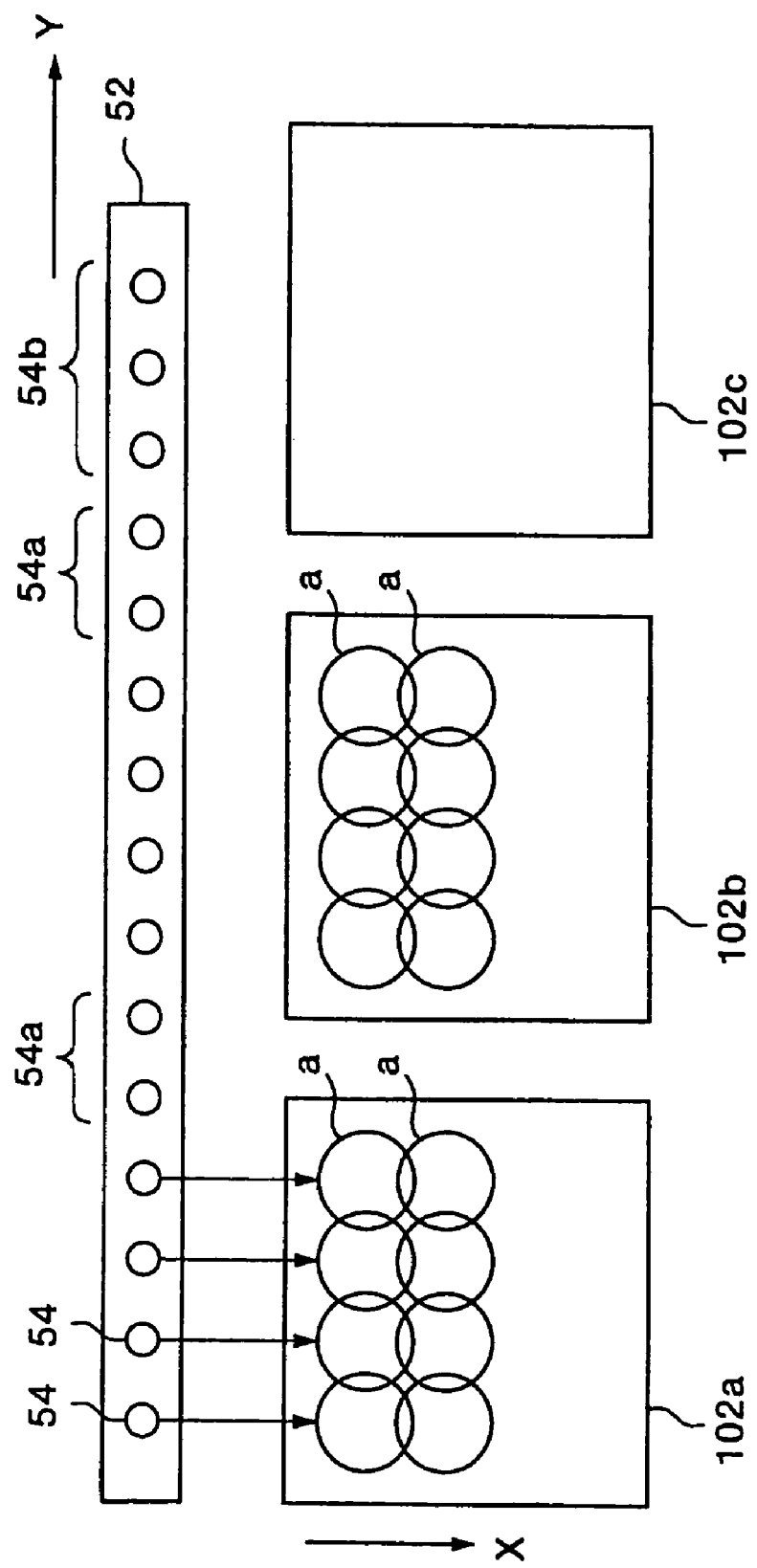
[FIG. 22]

【FIG. 23】
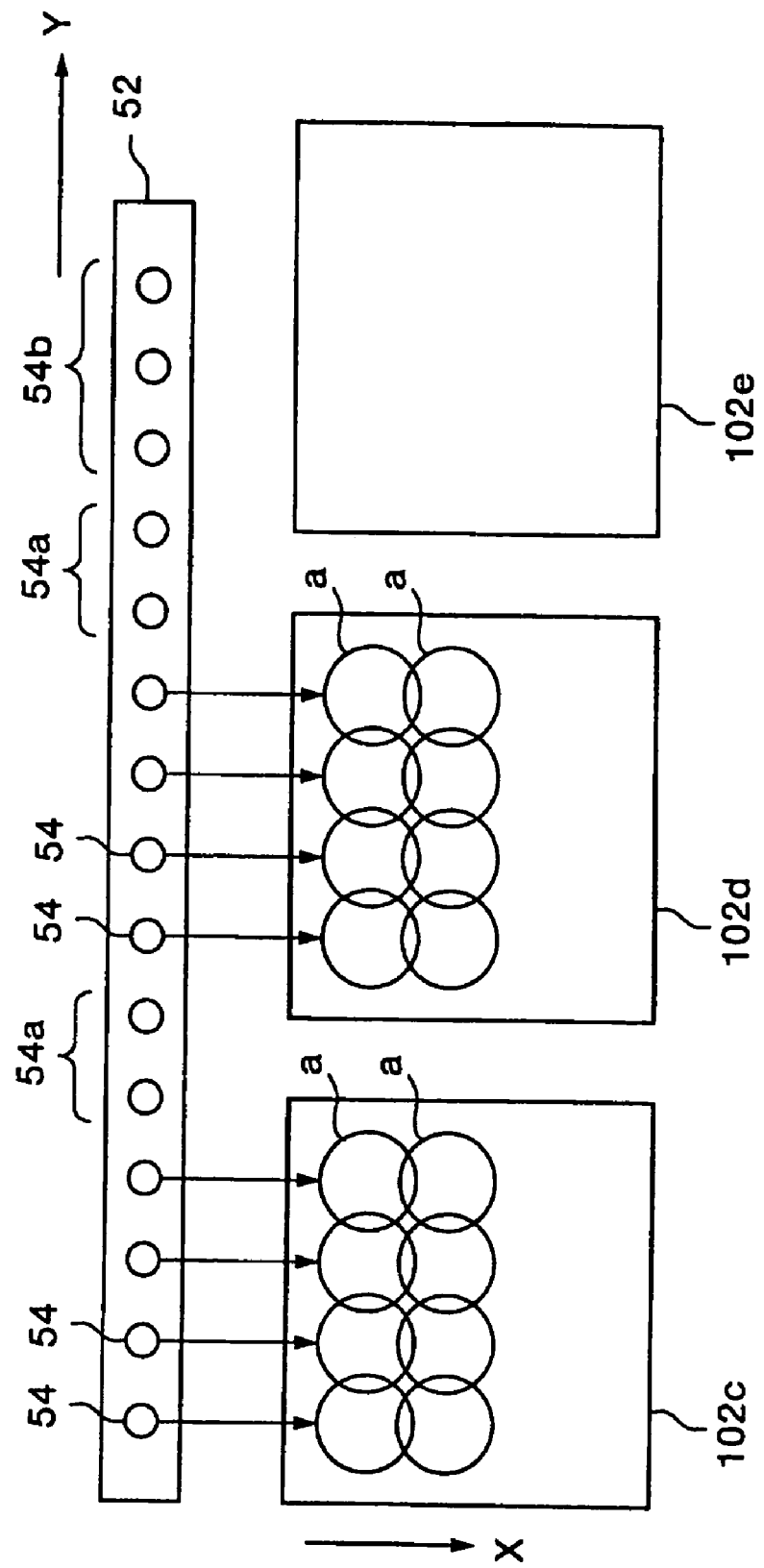

【FIG. 24】
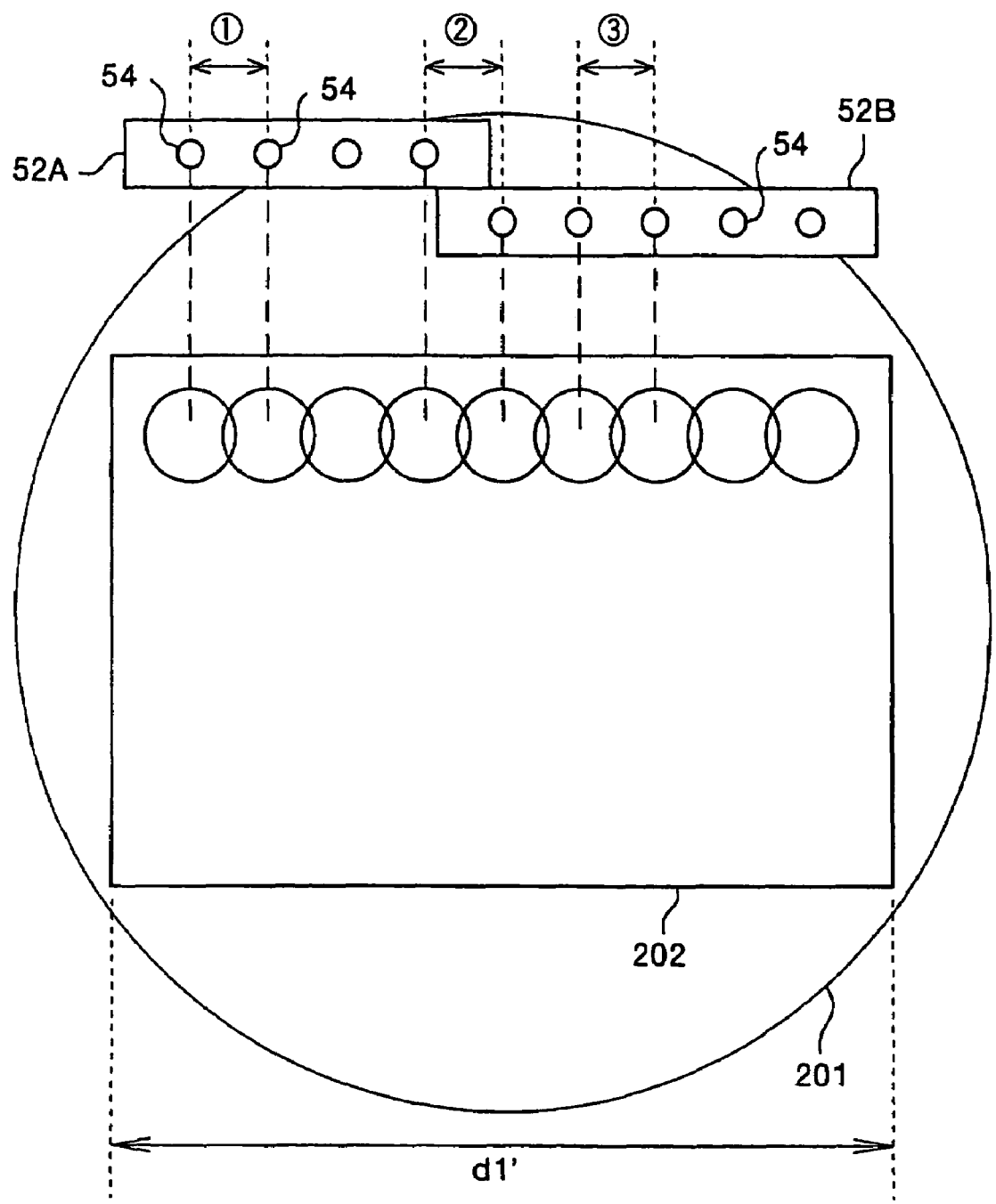

[FIG. 25]
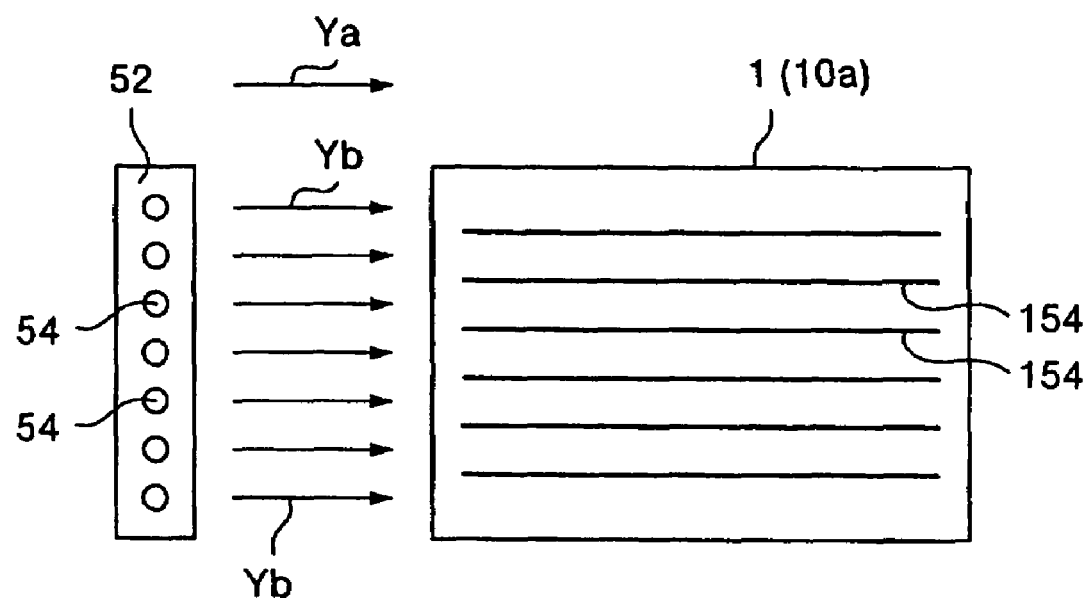

DEVICE FOR ARRANGING LIQUID DROPS, ELECTRO-OPTICAL PANEL, ELECTRO-OPTICAL DEVICE, ELECTRONIC APPARATUS, METHOD OF ARRANGING LIQUID DROPS, METHOD OF MANUFACTURING ELECTRO-OPTICAL PANEL, AND METHOD OF MANUFACTURING ELECTRONIC APPARATUS

RELATED APPLICATION

This application claims priority to Japanese Patent Application No. 2003-142045 filed May 20, 2003 which is hereby expressly incorporated by reference herein in its entirety.

BACKGROUND OF THE INVENTION

1. Technical Field of the Invention

The present invention relates to a device for arranging liquid drops, an electro-optical panel, an electro-optical device, an electronic apparatus, a method of arranging liquid drops, a method of manufacturing an electro-optical panel, and a method of manufacturing an electronic apparatus.

2. Description of the Related Art

Dispensers are provided as devices for applying liquid crystal within a region surrounded by a sealing material during manufacturing of liquid crystal panels. When dispensers are used, it is possible to drop the liquid crystal with a certain degree of precision and to a certain amount. However, when the liquid crystal of an amount equal to or less than that amount is dropped, there is insufficient reliability with respect to the degree of precision of the discharge amount. When the dispensers drop the liquid crystal, the drops directly become spots.

In Japanese Unexamined Patent Application Publication No. 5-281562, a method of manufacturing a liquid crystal panel using an inkjet method, in which the amount of a drop is extremely small and the drops can be discharged with a high degree of precision, is disclosed. According to the above publication, the main body of the inkjet for discharging the liquid crystal drops is scanned in lines with a pitch of 0.5 mm to thus apply the liquid crystal drops to a substrate in lines.

As mentioned above, the discharge of liquid (liquid crystal) by an inkjet method in order to prevent drop spots from being generated when the liquid (the liquid crystal) is dropped using a dispenser has been investigated. However, as a result of the present inventor performing experiments on application of the liquid crystal by the inkjet method, the following results on the drop spot were obtained.

That is, as illustrated in FIG. 25, an inkjet head 52 (hereinafter, referred to simply as a head in some cases) in which a plurality of heads 54 are provided is scanned with respect to a base member 1 in the direction of the arrow Ya to thus discharge the liquid crystal (the liquid drops) from each head 54 in the direction of the arrows Yb. After forming a thin film of the liquid crystal on the base member 1 by doing so, predetermined processes are performed to thus complete a liquid crystal panel. When the completed liquid crystal panel is illuminated, it is noted that lines (spots) 154 are formed on the base member 1 along the drawing direction. According to the above experiment, the dropped liquid is the liquid crystal. However, the above-mentioned lines (spots) are generated even when liquid other than liquid crystal is used.

In order to solve the above problems, it is an object of the present invention to provide a method of arranging liquid crystal drops, a device for arranging liquid crystal drops, and an electro-optical panel, in which lines or spots are not generated in an electro-optical panel coated with the liquid crystal by a method of discharging liquid drops including the ink jet method.

It is another object of the present invention to provide a method of arranging liquid drops, a device for arranging liquid drops, and an electro-optical panel, in which lines or spots are not generated in an electro-optical panel coated with the liquid by a method of discharging liquid drops including the inkjet method.

It is another object of the present invention to provide a method of arranging liquid drops, a device for arranging liquid drops, and an electro-optical panel, in which the quality of an electro-optical panel coated with the liquid by a method of discharging liquid drops including the inkjet method, does not deteriorate.

SUMMARY

A liquid drop arranging device according to the present invention is a liquid drop arranging device for arranging liquid drops made of liquid crystal on a substrate, and the liquid drops are arranged so that the adjacent liquid drops reach the substrate with a first pitch equal to or less than the diameter of the liquid drops immediately before reaching the substrate.

A liquid drop arranging device according to the present invention is a liquid drop arranging device for arranging liquid drops made of liquid crystal on a substrate, and when the diameter of the liquid drops at the moment the liquid drops reach the substrate is a first diameter and the diameter of the liquid drops when the diameter spreads from the first diameter is a second diameter larger than the first diameter, the liquid drops are arranged with a second pitch equal to or less than the first diameter so that the liquid drops of the first diameter contact each other when the adjacent liquid drops reach the substrate.

The liquid drop arranging device according to the present invention comprises a liquid drop discharge head scanned in a scanning direction. The liquid drops are discharged from a corresponding plurality of nozzles arranged with a third pitch in a sub-scanning direction that crosses the scanning direction of the liquid drop discharge head. The third pitch is set to a value that does not exceed the first pitch or the second pitch.

The liquid drop arranging device according to the present invention comprises a liquid drop discharge head scanned with a fourth pitch in the scanning direction for discharging the liquid drops with the fourth pitch: The fourth pitch is set to a value that does not exceed the first pitch or the second pitch.

The liquid drop arranging device according to the present invention comprises a liquid drop discharge head scanned in the scanning direction for discharging the liquid drops. The liquid drops are arranged so that an imaginary line that connects the centers of the liquid drops that reach the substrate and are adjacent to each other in the scanning direction to each other crosses the scanning direction.

In the liquid drop arranging device according to the present invention, when the diameter of the liquid drops at which the liquid drops reach the substrate is a first diameter and the diameter of the liquid drops when the diameter spreads from the first diameter is a second diameter larger than the first diameter, the liquid drops are arranged so that the entire outline of the liquid drop of the first diameter at the moment the liquid drops reach the substrate contacts the liquid drop of the first diameter adjacent to the liquid drop.

The liquid drop arranging device according to the present invention comprises a liquid drop discharge head scanned in the scanning direction for discharging the liquid drops. When the a plurality of liquid drop in the scanning direction is discharged, compared with the moment at which odd number liquid drops in the scanning direction are discharged, the liquid drops are discharged in a state where the liquid drop discharge head deviates by about half of the diameter of the liquid drops at the moment the liquid drops reach the substrate in a sub-scanning direction that crosses the scanning direction.

The liquid drop arranging device according to the present invention comprises a head group in which first and second liquid drop discharge heads that discharge the liquid drops and are scanned in the scanning direction are fixed to each other in a state where the first and second liquid drop discharge heads deviate from each other by about half of the diameter of the liquid drops at the moment the liquid drops reach the substrate in a sub-scanning direction that crosses the scanning direction. The head group is scanned with respect to the substrate in the scanning direction. When odd number liquid drops in the scanning direction are discharged, the liquid drops are discharged from the first liquid drop discharge head. When even number liquid drops in the scanning direction are discharged, the liquid drops are discharged from the second liquid drop discharge head.

The liquid drop arranging device according to the present invention comprises a liquid drop discharge head scanning in a scanning direction. The liquid drops are discharged from a corresponding plurality of nozzles arranged in a sub-scanning direction that crosses the scanning direction of the liquid drop discharge head with a third pitch. A fifth pitch smaller than the third pitch is set by rotating the liquid drop discharge head using a rotation shaft orthogonal to the surface in which the plurality of nozzles of the liquid drop discharge head are opened as a rotation center and by forming an angle between the direction in which the plurality of nozzles are arranged and the scanning direction. The fifth pitch is set so as to correspond to the diameter of the liquid drops immediately before reaching the substrate, which changes in accordance with the amount or the discharge speed of the liquid drops discharged from the liquid drop discharge head.

An electro-optical panel according to the present invention comprises a substrate and a thin film on the substrate, which is formed of liquid drops including liquid crystal discharged from a liquid drop discharge head. When the diameter of the liquid drops at the moment the liquid drops reach the substrate is a first diameter and the diameter of the liquid drops at the moment the liquid drop spreads from the first diameter is a second diameter larger than the first diameter, the liquid drops are arranged so that the liquid drops of the first diameter contact each other when the adjacent liquid drops reach the substrate.

An electro-optical device according to the present invention comprises the above-mentioned electro-optical panel according to the present invention.

An electronic apparatus according to the present invention comprises the electro-optical device according to the present invention.

There is provided a liquid drop arranging method for arranging liquid drops including liquid crystal on a substrate. When the diameter of the liquid drops at the moment the liquid drops reach the substrate is a first diameter and the diameter of the liquid drops at the moment the liquid drop spreads from the first diameter is a second diameter larger than the first diameter, the liquid drops are arranged so that the liquid drops of the first diameter contact each other when the adjacent liquid drops reach the substrate.

A method of manufacturing an electro-optical panel according to the present invention comprises the steps of (a) discharging liquid drops of a color filter material from a liquid drop discharge head to a base member and (b) discharging liquid crystal drops from the liquid drop discharge head to a color filter. In the step (b), when the diameter of the liquid drops at the moment the liquid drops reach the color filter is a first diameter and the diameter of the liquid drops at the moment the liquid drop spreads from the first diameter is a second diameter larger than the first diameter, the liquid drops are arranged so that the liquid drops of the first diameter contact each other when the adjacent liquid drops reach the color filter.

A method of manufacturing an electronic apparatus according to the present invention comprises the step of manufacturing an electronic apparatus by mounting surface-mounted components on an electro-optical panel manufactured by the method of manufacturing the above-mentioned electro-optical panel according to the present invention.

BRIEF DESCRIPTION OF THE DRAWINGS

FIG. 1 is a partial sectional view illustrating the structure of an electro-optical panel according to an embodiment of the present invention.

FIGS. 2a–e illustrate a part of a method of manufacturing the electro-optical panel according to the present embodiment.

FIGS. 3f–j illustrate a part of a method of manufacturing the electro-optical panel and an electronic apparatus according to the present embodiment.

FIG. 4 is a flowchart illustrating the method of manufacturing the electro-optical panel and the electronic apparatus according to the present embodiment.

FIGS. 5a–c illustrate a device for discharging liquid drops according to the present embodiment.

FIG. 6 is a perspective view illustrating a liquid drop discharge head of the device for discharging liquid drops according to the present embodiment.

FIG. 7 is a sectional view illustrating the liquid drop discharge head of the device for discharging the liquid drops according to the present embodiment.

FIG. 8 illustrates the liquid drop discharge head of the device for discharging the liquid drops according to the present embodiment.

FIG. 9 is a side view illustrating an experiment example according to the present embodiment.

FIG. 10 is a plan view illustrating an experiment example according to the present embodiment.

FIG. 11 is a plan view illustrating a state in which a thin film is formed according to the present invention.

FIG. 13 is a plan view illustrating the liquid drop dropped onto a substrate according to the present embodiment.

FIG. 14 is a plan view illustrating another experiment example according to the present embodiment.

FIG. 15 is a plan view illustrating an example of arranging the liquid drops according to the present embodiment.

FIG. 16 is a plan view illustrating another example of arranging the liquid drops according to the present embodiment.

FIG. 17 is a plan view illustrating another example of arranging the liquid drops according to the present embodiment.

FIG. 18 is a plan view illustrating another example of arranging the liquid drops according to the present embodiment.

FIG. 19 is a plan view illustrating another example of arranging the liquid drops according to the present embodiment.

FIG. 20 is a plan view illustrating an example of discharging the liquid drops according to the present embodiment.

FIG. 21 illustrates another example of discharging the liquid drops according to the present embodiment.

FIG. 22 illustrates an operation of the example of discharging the liquid drops according to the present embodiment.

FIG. 23 illustrates another operation of the example of discharging the liquid drops according to the present embodiment.

FIG. 24 is a plan view illustrating another example of discharging the liquid drops according to the present embodiment.

FIG. 25 is a plan view illustrating an experiment example according to the present invention.

DETAILED DESCRIPTION

Figure 12:
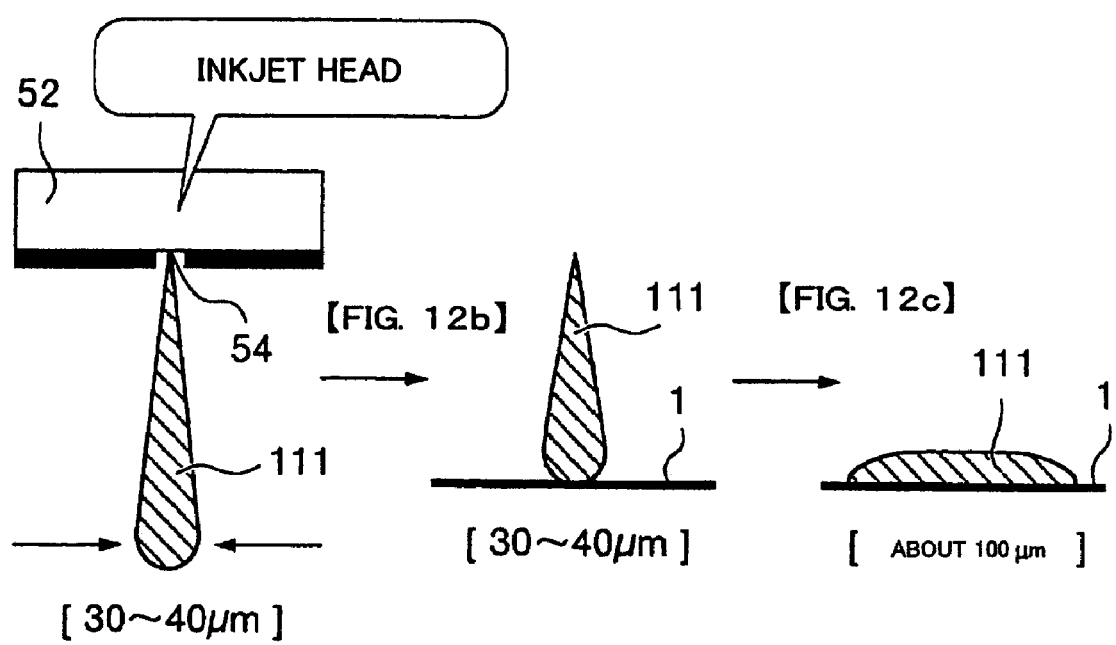
FIGS. 12a–c are side views illustrating a state of the liquid drop discharged from the liquid drop discharge head according to the present embodiment.

The embodiments of the present invention will now be further described with reference to the drawings. Also, the present invention is not restricted by the embodiments. A liquid crystal panel can be used as an electro-optical panel according to the present invention.

First Embodiment

A method of applying liquid crystal by an inkjet method will now be described as an embodiment of a method of discharging liquid drops according to the present invention. According to the first embodiment, a technology of preventing the generation of drop spots when the liquid crystal is dropped by an inkjet method is provided.

First, a liquid crystal panel (an electro-optical panel 100) manufactured by the method of applying the liquid crystal according to the present embodiment will now be described with reference to FIG. 1.

As illustrated in FIG. 1, in the electro-optical panel 100, liquid crystal 12 is sealed between a color filter substrate 10a in which color filters 11 are formed on the surface of a base member 1 and a counter substrate 10b that faces the color filter substrate 10a. Spacers 13 are arranged between the color filter substrate 10a and the counter substrate 10b. The distance t between the two substrates is maintained uniform over the entire surface.

In the color filter substrate 10a, a color filter protecting film 20 (hereinafter, a CF protecting film) is formed to thus protect the color filters 11 formed on the base-member 1. An ITO 14 and an alignment film 16 are formed on the CF protecting film 20.

The CF protecting film 20 protects the color filters 11 from the high temperature at which the ITO 14 is formed and planarizes the concavo-convex portions among the color filters 11 to thus prevent the ITO 14 from being short-circuited and the alignment film 16 from being poorly rubbed.

FIGS. 2 and 3 illustrate a method of manufacturing an electro-optical panel and an electronic apparatus according to the present embodiment. FIG. 4 is a flowchart illustrating the method of manufacturing the electro-optical panel and the electronic apparatus according to the present embodiment. FIG. 5 illustrates a device for discharging liquid drops according to the present embodiment.

First, as illustrated in FIG. 2(a), the color filters 11 are formed by discharging the liquid drops onto the base member 1 by photolithography, an inkjet method, or a plunger or the like (step S101).

Then, in order to improve the wettability of the color filters 11 and the liquid protecting film material with which the color filters 11 are coated, as illustrated in FIG. 2(b), a surface-reforming process is performed on the color filters 11 (step S102) to thus improve the wettability of the protecting film material. This is because, when the wettability is poor, the protecting film material easily coheres so that the color filters 11 are not uniformly coated with the protecting film material. Also, the protecting film material does not easily permeate into spaces among the color filters 11 so that bubbles may be generated in the spaces and the quality of displayed images of the electro-optical panel may thus deteriorate. According to the present embodiment, the surface-reforming process is performed by radiating ultraviolet (UV) rays onto the surfaces of the color filters 11 using a UV lamp 3. However, an oxygen plasma process may be performed. In particular, according to the oxygen plasma process, it is possible to remove residue on the color filter 11 and to thus improve the quality of the CF protecting film 20.

The wettability of the color filters 11 and the liquid protecting film material with which the color filters 11 are coated can be defined by the contact angle β of the protecting film material with respect to the color filter 11 (refer to FIG. 2(c)). According to the method of manufacturing the electro-optical panel of the present embodiment, the contact angle β is preferably equal to or less than 10°. When the contact angle β is in this range, since it is possible to permeate enough protecting film material into the spaces among the color filters 11 and to form the protecting film material on the color filters 11 with a uniform thickness, it is possible to form a high quality CF protecting film 20.

When the surface-reforming process is completed, as illustrated in FIG. 2(d), the color filters 11 are coated with the liquid protecting film material by discharging the liquid drops (step S103).

Here, the color filters 11 are coated with the protecting film material by discharging the liquid drops by the inkjet method.

The method of discharging the liquid drops of the protecting film material and the method of arranging the liquid drops may be the same as the following methods of discharging and arranging liquid crystal. Also, instead of the following methods of discharging and arranging the liquid crystal, a method of discharging the liquid drops of the well-known protecting film material by the inkjet method and a method of arranging the liquid drops may be adopted.

When the color filter substrate 10a is coated with the protecting film material, in order to volatilize solvents in the protecting film material, the protecting film material is dried (step S104). According to the present embodiment, as illustrated in FIG. 2(e), the base member 1 coated with the liquid drops of the protecting film material is put on a hot plate 67 to thus volatilize the solvents in the protecting film material.

At this time, in order to planarize the surface of the CF protecting film 20, the protecting film material is preferably dried at a low temperature by taking a certain time. Specifically, the protecting film material is preferably dried at a temperature equal to or less than 70° C. for no less than 5 minutes. In order to further planarize the surface of the CF protecting film 20, the protecting film material is preferably dried at a temperature equal to or less than 50° C. for no less than 10 minutes, and more preferably, at a temperature equal to or less than 30° C. for no less than 1 hour. Also, the protecting film material may be dried by an infrared heater or an oven as well as by the hot plate 67. By doing so, the solvents in the protecting film material are volatilized to thus form the CF protecting film 20 in the color filter substrate 10a.

Then, as illustrated in FIG. 3(f), the ITO 14 and the alignment film 16 are formed on the CF protecting film 20 (step S105).

The liquid drops of the material of the alignment film 16 are discharged by the inkjet method. A method of discharging the liquid drops of the material of the alignment film 16 and a method of arranging the liquid drops may be the same as the following methods of discharging and arranging the liquid crystal. Also, instead of the following methods of discharging and arranging the liquid crystal, the well-known methods of discharging the liquid drops of the material of the alignment film 16 by the inkjet method and of arranging the liquid drops may be adopted.

Then, the alignment film 16 is rubbed (step S106).

Next, as illustrated in FIG. 3(g), a sealing material 32 is formed on the alignment film 16 by screen printing or the like. Here, UV-hardening resin is used as the sealing material 32 (step S107).

When the formation of the sealing material is completed, as illustrated in FIG. 3(h), the alignment film 16 is coated with liquid crystal 33 by discharging the liquid drops (step S108). Here, a spacer material that forms the spacers 13 is mixed in the liquid crystal 33 discharged as the liquid crystal drops.

Here, how the alignment film 16 is coated with the liquid crystal 33 will be described with reference to FIG. 5.

According to the present embodiment, the liquid crystal drops are discharged by the inkjet method. As illustrated in FIG. 5(a), a liquid drop discharging device 50 includes a liquid drop discharge head 52 and a stage 60. The liquid crystal in which the spacer material is mixed is supplied from a tank 56 to the liquid drop discharge head 52 through a supply tube 58.

As illustrated in FIG. 5(b), a plurality of nozzles 54 are arranged within an arrangement width H and with a uniform pitch P. Also, each nozzle 54 includes a piezoelectric element (not shown). The liquid crystal drops are discharged from arbitrary nozzles 54 under the control of a control device 65. Also, it is possible to change the amount of the liquid crystal discharged from the nozzles 54 by changing a driving pulse supplied to the piezoelectric elements. Also, a personal computer or a workstation may be used as the control device 65.

An example of the structure of the liquid drop discharge head 52 will be described with reference to FIGS. 6 and 7. As illustrated in FIGS. 6 and 7, the liquid drop discharge head 52 includes, for example, a nozzle plate 131 and a vibration plate 132 that are made of stainless steel so that the nozzle plate 131 and the vibration plate 132 are connected to each other through a partitioning member (a reservoir plate) 133. A plurality of spaces 134 and a liquid reservoir 135 are formed between the nozzle plate 133 and the vibration plate 132 by the partitioning member. The spaces 134 and the liquid reservoir 135 are filled with a liquid material (not shown) and communicate with each other through a supply port 136. Also, a nozzle 54 that is a minute hole is formed in the nozzle plate 131 for jetting a liquid material 111 from the spaces 134. On the other hand, a hole 137 for supplying the liquid material 111 to the liquid reservoir 135 is formed in the vibration plate 132.

As illustrated in FIGS. 6 and 7, piezoelectric elements 138 are attached to the other surface of the vibration plate 132, which is opposite to the surface that faces the spaces 134. As illustrated in FIG. 7, the piezoelectric element 138 is positioned between a pair of electrodes 139 so that the piezoelectric element 138 is curved to protrude to outside when the pair of electrodes 139 is charged with electricity. The vibration plate 132 to which the piezoelectric elements 138 having the above structure are attached is integrated with the piezoelectric elements 138 to thus be curved to protrude outside so that the volume of the spaces 134 increases. Therefore, the liquid material whose amount corresponds to the increased amount of the volume of the spaces 134 is received from the liquid reservoir 135 through the supply port 136. Also, when the flow of-the electricity to the piezoelectric elements 138 is stopped in such a state, the piezoelectric elements 138 and the vibration plate 132 return to their original shapes. Therefore, since the spaces 134 also return to their original volume, the pressure of the liquid material 111 in the spaces 134 increases so that the jet liquid drops of the liquid material are discharged from the nozzles 54 to the base member 1.

Methods other than the piezo jet type using the piezoelectric elements as mentioned above may be used as a method of the liquid drop discharge head 52. Also, the liquid crystal, which is the liquid material 111, may be jetted from the minute hole by generating vibrations by a supersonic motor and a linear motor or by applying pressure to the tank. Here, the liquid crystal in the tank is preferably defoamed. Also, the liquid drop discharge head 52 may be formed by a bubble jet (R) method in which the liquid crystal in the tank or a mixture of the liquid crystal and low viscosity volatile liquid is heated to thus jet the liquid crystal from the minute hole by the expansion and foaming of the above material.

The liquid drop discharge head 52 can rotate around a rotation shaft A using the rotation shaft A orthogonal to the head center as a rotation center. As illustrated in FIG. 5(c), when the liquid drop discharge head 52 is rotated around the rotation shaft A and an angle θ is formed between the direction in which the nozzles 54 are arranged and the direction X, it is possible to make the pitch of the nozzles 54 P'=P×Sin θ. Therefore, it is possible to change the pitch of the nozzles 54 in accordance with regions coated with the liquid crystal or conditions under which the regions are coated with the liquid crystal. A substrate 1 having transparent electrodes on which an alignment process is performed is provided on a stage 60. The stage 60 can move in the direction Y (the sub-scanning direction) and can rotate around a rotation shaft B using the rotation shaft B orthogonal to the center of the stage 60 as a rotation center.

The liquid drop discharge head 52 reciprocates in the direction X (the main scanning direction) in the drawing while discharging the liquid crystal drops on the alignment film 16 with the arrangement width H of the nozzles 54. When the alignment film 16 is coated with the liquid crystal by performing scanning once, the stage 60 moves in the direction Y by the arrangement width H of the nozzles 54 and the liquid drop discharge head 52 discharges the liquid crystal to the next region. The operation of the liquid drop discharge head 52, the discharge of the nozzles 54, and the operation of the stage 60 are controlled by the control device 65. When the operation patterns are programmed in advance, it is possible to easily change the pattern in which the regions are coated with the liquid crystal in accordance with the regions coated with the liquid crystal or the conditions under which the regions are coated with the liquid crystal it is possible to coat all regions to be coated with the liquid crystal by repeating the above operations.

The pitch of the nozzles 54 of the liquid drop discharge head 52 and the scanning pitch in the main scanning direction (the drawing direction) will now be described with reference to FIG. 8.

FIG. 8 is a plan view illustrating a state in which the liquid crystal drops discharged from the liquid drop discharge head 52 are dropped. The liquid crystal drops are dropped onto the alignment film 16 of the color filter substrate 10a by a distance of 10 μm in the main scanning direction (the direction X) and by a distance of 100 μm in the sub-scanning direction (the direction Y). In this case, the distance y of the liquid drops in the sub-scanning direction is the same as the pitch P of the nozzles 54. The distance x of the liquid drops in the main scanning direction is dependent on the scanning speed and the discharge frequency of the liquid drop discharge head 52.

Next, the arrangement of the liquid crystal drops discharged by the inkjet method according to the present embodiment will now be described.

First, the experiment illustrated in FIG. 25 will be described with reference to FIGS. 9 and 10. FIG. 9 is a side view illustrating the liquid drop discharge head 52 used for the experiment of FIG. 25 and a state of liquid drops 71 on the base member 1. FIG. 10 is a plan view of FIG. 9.

When the liquid crystal drops are discharged from the nozzles 54 of the head 52 and are dropped onto the base member 1, the liquid drops spread to be circular in a moment centering around the applying points so that the liquid drops 71 each having a predetermined diameter da are formed. As illustrated in FIGS. 9 and 10, when the adjacent liquid drops 71 contact each other, the liquid drops 71 are connected to each other from the contact position so that the liquid drops 71 are integrated with each other to thus form a single thin film 72 as illustrated in FIG. 11.

Therefore, in order to form the single thin film 72, it is necessary to set the pitch p1 between the nozzles 54 so that the adjacent liquid drops 71 contact each other. According to the present example, since the diameter da of each liquid drop 71 spreading on the base member 1 is 100 μm corresponding to the amount of the liquid crystal per a drop discharged from each nozzle 54, the pitch p1 between the nozzles 54 is set to 100 μm.

As a result of the experiment, when the liquid crystal drops are discharged from the nozzles 54 the pitch p1 between which is set as mentioned above, the liquid drops 71 are connected to each other to thus be integrated with each other as assumed. As a result, the single thin film 72 illustrated in FIG. 11 is obtained. At this point of time that is an experiment process, the thin film 72 that covers a desired range is formed so that no special problems seem to exist. However, when a liquid crystal panel is created by performing the following predetermined processes (steps S109 to S111) on the base member i formed with the thin film 72 and the liquid crystal panel is illuminated, the lines or spots 154 are generated as illustrated in FIG. 25.

Next, the state of the liquid crystal from the moment at which the liquid crystal is discharged from the nozzle 54 of the head 52 to the moment at which the liquid crystal is placed on the base member 1 will now be described with reference to FIG. 12.

FIG. 12(a) illustrates a state in which the liquid crystal drop 111 is discharged from the nozzle 54 of the head 52. The diameter of the liquid crystal drop 111 at the moment the liquid crystal drop 111 is discharged from the nozzle 54 is 30 to 40 μm.

FIG. 12(b) illustrates a state in which the liquid crystal drop 111 discharged from the nozzle 54 is placed on the base member 1 (the point of time when the liquid crystal drop 111 first contacts the base member 1). The diameter of the liquid crystal drop 111 at the moment the liquid crystal drop 111 is placed on the base member 1 is 30 to 40 μm, which does not change from the diameter of the liquid crystal drop 111 when the liquid crystal drop 111 is discharged from the nozzle 54 as illustrated in FIG. 12(a).

FIG. 12(c) illustrates a state in which the liquid crystal drop 111 is dropped onto the base member 1 and spreads. The diameter of the liquid drops 111 spreading on the base member 1 is about 100 μm.

As illustrated in FIGS. 12(b) and (a), the liquid drop 111 with the diameter (30 to 40 μm) that does not change from the diameter of the liquid drops 111 discharged from the head 52 collides with the base member 1 at the moment of placing the liquid drop 111 on the base member 1. Then, as illustrated in FIG. 12(c), the liquid drop 111 spreads in a moment. The diameter of the liquid drops 111 illustrated in FIG. 12(a) at the moment the liquid drop 111 is discharged is 30 to 40 μm. As illustrated in FIG. 12(b), at the moment of placing the liquid drop 111 on the base member 1, the liquid drop 111 of the above-mentioned size collides with the base member and spreads (FIG. 12(c)).

The reference sign a of FIG. 13 denotes a part of the liquid drop 111 at the moment of being placed on the base member 1, which is illustrated in FIG. 12(b) and whose diameter is about 30 to 40 μm. The reference sign b of FIG. 13 denotes the portion of the spreading liquid drop 111 illustrated in FIG. 12(c), whose diameter is about 100 μm.

As illustrated in FIG. 5(c), it is possible to variably set the pitch P' of the nozzles by rotating the liquid drop discharge head 52 according to the present embodiment around the rotation shaft A. The experiment of checking the generation of the lines or spots 154 when the pitch between the nozzles 54 is changed to a plurality of values, which will be described next, can be realized due to the structure of FIG. 5(c).

That is, the present inventor performed an experiment of setting the pitch P' between the nozzles 54 as a plurality of values and checked the amount of lines or spots 154. As a result, the following result is obtained. As illustrated in FIG. 14, in the case where the liquid crystal is drawn by the inkjet method, when the nozzle pitch or the discharge distance (the pitch in the main scanning direction) is adjusted to the diameter (about 100 μm according to the above example and the reference sign b of FIG. 13) of the liquid drop spreading after being placed, the spot is not generated in the portion where the liquid drops are placed (the portion of 30 to 40 μm according to the above example and the reference sign a of FIG. 13), however, is generated in the portion where the liquid drop spreads (the portion in which the liquid drop spreads to thus move until the liquid drops are connected to the adjacent liquid drop and the reference sign b of FIG. 13). The result corresponds to the above-mentioned state of FIG. 25.

Therefore, as illustrated in FIG. 15, when the liquid crystal is drawn by the inkjet method, the discharge distance (when the head has a plurality of nozzles, the nozzle pitch) in the sub-scanning direction (orthogonal to the main scanning direction) and the discharge distance in the main scanning direction are made equal to or less than the diameter of the liquid drops (30 to 40 µm according to the above example and the reference sign a of FIGS. 15 and 13) immediately before (immediately after) being placed before spreading so that the liquid drop 111 is not arranged (placed or dropped) on the base member 1 to exceed the distance. That is, instead of adjusting the pitch in the sub-scanning direction and the pitch in the main scanning direction to the diameter (the reference sign b of FIGS. 13 and 14) at the moment the liquid drops are placed, the pitch in the sub-scanning direction and the pitch in the main scanning direction to the diameter are made equal to or less than the diameter of the liquid drops (the reference Sign a of FIGS. 13 and 15) immediately before the liquid drops are placed and the liquid crystal-drops 111 are arranged on the base member 1.

Also, in FIG. 14, only the problems of the nozzle pitches are described and the problems of the pitch in the main scanning direction are not described. However, the problems of the pitch in the main scanning direction are the same as the problems of the nozzle pitch. That is, as illustrated in FIG. 14, when the nozzle pitch is too wide, the lines or spots that extend to the main scanning direction are generated (refer to FIG. 25) in the regions that exceed the diameter of the liquid drops (the reference sign a of FIGS. 14 and 13) immediately before the liquid drops are placed as denoted by the reference numeral 91. When the pitch in the main scanning direction is too wide, the lines or spots that extend to the sub-scanning direction are generated (when both pitches are too wide, the lines or spots are generated in both directions).

FIG. 15 illustrates a state in which the nozzle pitch and the pitch in the main scanning direction are adjusted to the diameter of the liquid drops (the reference sign a of FIGS. 15 and 13) immediately before the liquid drops are placed. In FIG. 15, since the liquid drops before spreading are connected to each other, it is possible to prevent the generation of the lines or spots.

FIG. 15 illustrates a state in which the nozzle pitch and the pitch in the main scanning direction are set to be smaller than the diameter of the liquid drops (the reference sign a of FIGS. 15 and 13) immediately before the liquid drops are placed. However, the respective pitches need not be smaller than the diameter of the liquid drops immediately before the liquid drops are placed. In FIG. 15, the adjacent liquid drops (the reference sign a of FIGS. 15 and 13) overlap each other. However, the adjacent liquid drops need not overlap each other. As illustrated in FIG. 16, in order to connect the liquid drops (the reference sign a of FIGS. 15 and 13) to each other to thus form the single thin film, the adjacent liquid drops (the reference sign a of FIGS. 15 and 13) only have to contact each other.

As illustrated in FIG. 16, when the plurality of nozzles 54 are formed in the head 52, the pitch Py between the nozzles 54 is the "distance equal to or less than the diameter of the liquid drops (the reference sign a of FIG. 13) immediately before (immediately after) the liquid drops are placed before spreading". Also, in the drawing direction (the main scanning direction: refer to the arrow Yc of FIG. 10), the distance (the pitch) Px by which the liquid drops are discharged is the "distance equal to or less than the diameter of the liquid drops (the reference sign a of FIG. 13) immediately before (immediately after) the liquid drops are placed before spreading".

When the drawing is performed by the method illustrated in FIGS. 16 and 15, since a liquid drop before spreading overlaps another adjacent liquid drop before spreading, the drop sport are not generated. As mentioned above, when the liquid drops 111 are arranged (is dropped onto the base member 1) during the drawing, the distance between the adjacent liquid drops 111 in the main scanning direction and the distance between the adjacent liquid drops 111 in the sub-scanning direction are "equal to or less than the diameter of the liquid drops before spreading".

Here, the "diameter of the liquid drops before spreading" changes in accordance with the amount or the discharge speed of the liquid drops 111 discharged from the head 52. As illustrated in FIG. 5(*c*), the pitch P' of the nozzles 54 can be set in accordance with the "diameter of the liquid drops before spreading", which changes in accordance with the amount or the discharge speed of the liquid drops 111 discharged from the head 52.

FIG. 17 illustrates a modification of the present embodiment.

According to the present modification, unlike in FIGS. 15 and 16, even number liquid drops (the reference sign a of FIG. 13) in the main scanning direction immediately before (immediately after, hereinafter, only immediately before) being placed before spreading are dropped so as to deviate from the right position to the sub-scanning direction by half the diameter of an odd liquid drop (the reference sign a of FIG. 13) immediately before being placed before spreading.

FIG. 18 illustrates an arrangement in which the applying centers of the liquid drops in FIG. 17 approach each other. In FIG. 15, the regions surrounded by four arcs, which are denoted by the reference numeral 92 are not the liquid drops (the reference sign a of FIGS. 13 and 15) but the portions spreading from the liquid drops. Therefore, the portions 92 may become spots though slight in theory. On the other hand, in FIG. 18, an arbitrary liquid drop (the reference sign a of FIGS. 13 and 17) overlaps another adjacent liquid drop (the reference sign a of FIGS. 13 and 17) over the external circumference. Therefore, spots are not generated.

There are two methods of realizing the above. First, when a plurality of liquid drops (the reference sign a of FIG. 13) are drawn, as illustrated in the arrow Ye of FIG. 17, compared with the case where the odd number liquid drops (the reference sign a of FIG. 13) are drawn, the liquid drops are drawn by deviating the head 52 from the right position by half the diameter of the liquid drops (the reference sign a of FIG. 13) to the sub-scanning direction with respect to the base member 1.

Second, as illustrated in FIG. 19, a head group 52*a* obtained by fixing a pair of (a plurality of) heads 52 to each other so that one head 52 deviates from the other by half the diameter of the liquid drops (the reference sign a of FIG. 13) to the sub-scanning direction is scanned (mainly scanned) to the base member 1. When the odd number liquid drops (the reference sign a of FIG. 13) are drawn, the liquid drops are discharged from the nozzles 54 of the first head 52 in the head group 52*a*. When the even number liquid drops (the reference sign a of FIG. 13) are drawn, the liquid drops are discharged from the nozzles 54 of the second head 52 in the head group 52*a*.

As mentioned above, according to the present embodiment, the liquid drops 111 are discharged so that a liquid drop 111 immediately after being placed (dropped) on the base member 1 before spreading is dropped so as to contact another adjacent liquid drop 111 in the same state (immediately after being placed before spreading).

Next, the method of discharging the liquid crystal drops by the inkjet method according to the present embodiment will now be described.

Here, it is possible to prevent the generation of the spots of the liquid crystal. The spots are row changing lines generated on the boundary of the film drawn by the main scanning performed before and after performing the sub-scanning.

As a result of determining the cause of the above problem, it is noted that, in the portion drawn by performing main scanning once, an interface between the liquid crystal (the liquid) and the air is generated on the substrate and that the portion becomes the spot of the liquid crystal (the liquid).

Therefore, the drawing of all of the coated range of one unit (the coated area, for-example, a single chip) is completed by performing the main scanning only once.

As mentioned above, when the region that cannot be drawn by performing first main scanning since the region exceeds the range in which the nozzles of the inkjet head are formed among the range to be coated with the liquid crystal (the liquid) is drawn by performing second main scanning, the spots of the liquid crystal (the liquid) are generated. This will be described with reference to the following drawings.

FIG. 20 illustrates a case in which a plurality of chips 102 is formed on a wafer 101. Each of the plurality of chips 102 constitutes a liquid crystal panel of, for example, a mobile telephone. The liquid crystal drops are simultaneously discharged to the plurality of chips 102 using the plurality of nozzles 54 formed in the liquid drop discharge head 52.

In this case, in order to improve the productivity, it is preferable that the liquid drops be discharged to the chips 102 as many as possible on the wafer 101 using all of the nozzles 54 of the liquid drop discharge head 52 from one end to the other end to the direction where the liquid drop discharge head 52 extends by performing the main scanning (in the direction X) once.

In FIG. 20, the chips 102 are arranged in the order of the reference numerals 102a, 102b, 102c, . . . , and 102z from the left end of the wafer 101. In this case, as illustrated in FIG. 20, when the nozzle 54 of one end of the liquid drop discharge head 52 is adjusted to the position of the chip 102a in which the liquid drops are arranged, the nozzle 54 in the other end of the liquid drop discharge head 52 is positioned in the middle of the chip 102c.

In order to improve the productivity, it is preferable that all of the nozzles 54 be used in the arrangement state of the liquid drop discharge head 52 illustrated in FIG. 20. That is, it is preferable that the entire regions of the chips 102a and 102b and the region to the middle of the chip 102c be coated with the liquid drops by performing the first main scanning and that the remaining half of the chip 102c and the chips after the chip 102d including the chip 102d be coated with the liquid drops by performing the second main scanning. As mentioned above, it is possible to reduce the number of performances of the main scanning required for coating the plurality of chips 102 on the wafer 101 by using all of the nozzles 54 from one end to the other end in the longitudinal direction of the liquid drop discharge head 52. According to the method, it is possible to improve the productivity. Therefore, the method is commonly used.

However, according to the above method, as illustrated in FIG. 21, the liquid crystal drops are discharged to one chip 102c by performing the second (a plurality of times) main scanning. Therefore, in the area (the coated area) to be coated with the liquid crystal in the chip 102c, an interface 105 between the liquid crystal and the air is generated in the end of the region coated with the liquid crystal by performing the first main scanning. Then, the interface 105 is coated with the liquid crystal drops by performing the second main scanning. However, the spot is generated in the interface 105.

Here, the coated area is a region to be coated with the liquid crystal (the liquid), in which it is desired to avoid the generation of coating spots, in maximum units in terms of an area (each of the chips 102a to 102z according to the present example). That is, the coated area is the region, whose entire surface should be uniformly coated, in the maximum units in terms of an area (a chip according to the present example, however, a substrate when a single substrate is formed of one wafer). The coated area is commonly a display area in a single panel.

Therefore, according to the present embodiment, as illustrated in FIGS. 21 and 22, when there exists a coated area (according to the present example, the chip 102c) that cannot be coated by performing the main scanning once among the plurality of coated areas (according to the present example the chips 102a to 102z), the coated area (according to the present example, the chip 102c) is not coated with the liquid crystal drops by performing the main scanning of the time in order to prevent the generation of the spot.

That is, as illustrated in FIG. 22, when the main scanning of the liquid drop discharge head 52 is performed in a state where the liquid drop discharge head 52 covers only the chip 102c only to the middle of the chip 102c, the entire region of the chip 102c cannot be coated by performing the main scanning once. When the main scanning is performed in such a state, the nozzle denoted by the reference numeral 54b above the chip 102c is controlled not to discharge the liquid crystal drop. It is possible to prevent the generation of the interface between the liquid crystal and the air on the chip 102c by controlling the nozzle 54b not to discharge the liquid crystal drops and to thus prevent the generation of the coating spots.

In general, in view of the productivity, it is tried to reduce the number of performances of the main scanning by discharging the liquid crystal drops from the nozzle above the chip. However, according to the present invention, the quality (prevention of the generation of coating spots of the liquid crystal) is the first priority even at the expense of productivity.

As mentioned above, the chips 102a and 102b are coated with the liquid drops by performing the first main scanning. Also, the liquid drops are not discharged from the nozzle denoted by the reference numeral 54a by performing the main scanning in the position of the drawing (like in the conventional art). This is because the nozzle denoted by the reference numeral 54a is positioned above the area to which the liquid drops are not to be discharged (in which chips do not exist).

Next, the liquid drop discharge head 52 performs the sub-scanning from the position illustrated in FIG. 22 in the direction of the arrow Y. As a result, as illustrated in FIG. 23, when the liquid drop discharge head 52 reaches the position in which the liquid drops discharged from the liquid drop discharge head 52 can coat all of the regions of the chip 102c that are not coated in a previous time (by performing the first main scanning) by performing the second main scanning, the chip 102c is coated with the liquid drops by performing the second main scanning.

In the second main scanning, like in the first main scanning, among the plurality of coated areas (according to the present example, the chips 102a to 102z), when there exists a coated area (according to the present example, the chip 102e) in which all of the regions cannot be coated by performing the main scanning once, the coated area (according to the present example, the chip 102e) is not coated with the liquid crystal drops by performing the main scanning. Then, third main scanning is performed.

According to the above example, during the main scanning of the respective times, when the liquid crystal drops are discharged to two columns of chips 102 (to the-chips 102a and 102b in the first main scanning and to the chips 102c and 102d in the second main scanning), the liquid crystal drops are not discharged from the nozzles 54 corresponding to the positions of the chips 102 of the third column (to the chip 102c in the first main scanning and to the chip e in the second main scanning 102e). When the objects to be coated with the liquid crystal drops are difference from those on the wafer 101 of FIG. 20, that is, when the size or the arrangement of the chips on the wafer is difference from that of FIG. 20, to how many columns of chips the liquid crystal drops are discharged and from which nozzle 54 corresponding to the position of chip that belongs to which column the liquid crystal drops are not discharged varies with the main scanning of each time. Here, for example, from the following equation, it is possible to obtain the number of columns of the chips from which the liquid crystal drops are to be discharged during the main scanning each time.

The maximum value of n that meets $n \times d1 + (n-1) \times d2 \leq L$ is obtained.

As illustrated in FIG. 20, d1 denotes the width of each chip 102 (the length of the side of the chip 102 along the direction to which the liquid drop discharge head 52 extends, specifically, the width of the region in which a liquid crystal film is to be formed in the chip 102). d2 denotes the distance between the chips 102 (specifically, the distance between the regions in which the liquid crystal films are to be formed in the adjacent chips 102). L denotes the length of the liquid drop discharge head 52 (more specifically, the length between the nozzle 54 of one end in the direction where the liquid drop discharge head 52 extends and the nozzle of the other end) to the direction in which the liquid drop discharge head 52 extends.

During the first main scanning, the chips to the nth column are coated with the liquid drops and the liquid drops are not discharged from the nozzle 54 corresponding to the position of the (n+1)th column.

During the second main scanning, on the bases of the (n+1)th column, the chips to the nth column (n+1−1+n) are coated with the liquid drops and the liquid drops are not discharged from the nozzle 54 corresponding to the position of the chip of the (n+1−1+n)th column.

In the example of FIG. 20, the maximum value of n is 2 so that the following equations are established.

$$2 \times d1 + (2-1) \times d2 \leq L$$

$$3 \times d1 + (3-1) \times d2 > L$$

During the first main scanning, the chips to the second column (102a and 102b) are coated with the liquid drops and the liquid drops are not discharged from the nozzle corresponding to the position of the chip (102c) of the (2+1=3)rd column.

During the second man scanning, the chips (102c and 102d) of two columns (2+1−1+2=4) based on the (2+1=3)rd column are coated with the liquid drops and the liquid drops are discharged from the nozzle 54 corresponding to the position of the chip (102e) of the (2+1−1+2+1=5)th column.

As mentioned above, the main scanning of each time when the chips 102 of a plurality of columns are coated with the liquid drops is performed on the chips of the columns of the maximum value of n that meets $n \times d1 + (n-1) \times d2 \leq L$. Therefore, it is possible to prevent a certain chip 102 from being coated by performing a plurality of times of main scanning. Also, an operator can pre-input the n value to a program and the liquid drop discharge head 52 can coat the chips with the liquid drops in accordance with the input n value.

That is, when the main scanning is performed once, no matter what chip (coated area) 102 is selected, it is not possible that both coated regions and non-coated regions exist in the single chip 102. No matter what chip 102 is selected, all of the coated areas in the single chip 102 are coated by performing the main scanning once. As mentioned above, since all of the regions of the single coated area are coated by performing the main scanning once, no interface is generated between the liquid (the liquid crystal) and the air on the single coated area. Therefore, no spots are generated in joints of scanning in display regions.

Also, as illustrated in FIG. 15, in the liquid drop discharge head 52 of FIG. 20, the pitch between the nozzles 54 is determined by overlapping one liquid crystal drop before spreading with another adjacent liquid crystal drop before spreading on each chip. So is the discharge distance in the main scanning direction.

Instead of the above, as illustrated in FIG. 18, in the liquid drop discharge head 52 in FIG. 20, the pitch between the nozzles 54 is determined by overlapping one liquid crystal drop before spreading with another adjacent liquid crystal drop before spreading. So is the discharge distance in the main scanning direction. In this case, as illustrated in FIG. 18, an arbitrary liquid crystal drop (the reference sign a of FIGS. 13 and 17) overlaps another liquid crystal drop (the reference sign a of FIGS. 13 and 17) over the external circumference.

FIG. 24 illustrates a modification of the present embodiment.

In FIG. 20, the length L of the liquid drop discharge head 52 is larger than the width d1 of the single coated area. All of the regions of at least one coated area can be coated by performing the main scanning once. On the other hand, in FIG. 24, a single substrate 202 is formed on a single wafer 201. In the case of FIG. 24, the coated area (a substrate 202) is larger than the coated area (the chip 102) of the case of FIG. 20. In order to coat all of the regions of the coated area by performing the main scanning once, it is necessary to form nozzles in the range equal to the width d1' of the substrate 202.

When the length of the single liquid drop discharge head 52 is smaller than the width d1' of the substrate 202, the nozzles 54 are located in the range equal to the width d1' by connecting the plurality of liquid drop discharge heads 52A and 52B to each other. As illustrated in FIG. 20, even when the length of the single liquid drop discharge head 52 is larger than the width d1 of the chip of the coated area (the chip 102), in order to coat a wider range of coated area by performing the main scanning once, the plurality of liquid drop discharge heads 52 can be connected to each other.

In this case, the pitches ① and ③ between the nozzles 54 of the plurality of liquid drop discharge heads 52A and 52B connected to each other are equal in accordance with defined pitches (refer to FIGS. 15 and 18).

The nozzle pitch ② in the connecting portion between the plurality of liquid drop discharge heads 52A and 52B is set to be equal to the defined nozzle pitch ①. For example, ①=②=③=30 to 40 μm.

As mentioned above, when the inkjet head performs a plurality of times of scanning to thus drop the liquid crystal onto a display area, interfaces between the liquid crystal and the air are generated in the display area by the number of performances of scanning and the portions become drawing spots. However, according to the present embodiment, since the liquid crystal is dropped to all of the regions in the display range of a panel by performing drawing (scanning) once, it is possible to remove the interfaces between the liquid crystal and the air in the display area and to thus prevent the generation of the spots due to the application of the liquid crystal.

Also, when the drawing range is wide, the plurality of heads are bonded to each other to constitute one head. Therefore, it is possible to omit row changing works during the drawing and to thus remove the spots in the row changing portions.

As mentioned above, when coating with the liquid crystal drops is completed and a single thin film is formed as illustrated in FIGS. 11 and 3(i), the process proceeds to the next step. That is, through a process of attaching the color filter substrate 10a coated with the liquid crystal to the counter substrate 10b (step S109), an electro-optical panel 100 is completed.

Next, as illustrated in FIG. 3(j), a harness, an FC (flexible cable) substrate 7, and a driver IC 5 are mounted on the completed electro-optical panel 100 (step S110). As illustrated in FIG. 3(k), the electro-optical panel 100 is attached to an electronic apparatus 9 such as a mobile telephone or a personal digital assistant (PDA) to thus complete the electronic apparatus (step S111).

According to the present embodiment, the application position by the inkjet method is described with respect to the liquid crystal drops. This is because the lines or spots generated when the liquid crystal is dropped on the alignment film particularly matter. The liquid crystal matters since there exists the interaction between the liquid crystal and the materials of the alignment film (for example, 3% of polyimide and 97% of a solvent) and the liquid crystal drops without including a solvent are dropped.

However, the present invention in relation to the application position by the inkjet method is not restricted to the liquid crystal drops. That is, the present invention can be widely applied to liquid drops discharged by the inkjet discharging method. There are various liquid drops discharged by the inkjet discharging method including a liquid drop for forming a beta film uniformly coated all of the substrate such as a photoresist film (about 1 μm), an overcoat film (equal to or less than 10 μm), and the alignment film required for manufacturing the electro-optical panel (a liquid crystal display device or an organic EL panel) and a liquid drop for forming a film that constitutes a layer in each pixel such as a color filter and an organic EL material (light emitting material ink: after baked, several tens of nanometers). Also, the inkjet discharging method can be widely applied to industries such as liquid drops that constitute a liquid film such as a photoresist film required for other fields than the manufacturing of the electro-optical panel. The present invention can be widely applied to these liquid drops.

Objects to which the Present Invention can be Applied

Electronic apparatuses to which the electro-optical panel according to the present invention can be applied include apparatuses using the electro-optical panels that are electro-optical devices such as a mobile telephone, a personal information apparatus or a portable personal computer referred to as PDAs, a personal computer, a digital camera, a vehicle-mounted monitor, a digital video camera, a liquid crystal TV, view finder type and monitor direct view type video tape recorders, a car navigation device, a pager, an electronic organizer, a calculator, a word processor, a workstation, a picture telephone, and a POS terminal. Therefore, the present invention can be applied to electrical connection structures in these electronic apparatuses.

Also, the electro-optical panel is a transmissive or reflective electro-optical panel, in which a backlight is used as an illuminating device (not shown). Also, the same is true of a color electro-optical panel in an active matrix. For example, according to the above-mentioned embodiments, electro-optical panels in a passive matrix are illustrated. However, the electro-optical panel in the active matrix (for example, an electro-optical panel including a thin film transistor (TFT) or a thin film diode (TFD) as a switching element) can be used as the electro-optical device according to the present invention. Also, it is possible to apply the present invention to various electro-optical devices in which display states of a plurality of pixels can be respectively controlled such as an electroluminescence (EL) device, an inorganic electroluminescence (EL) device, a plasma display device, an electrophoresis display device, a field emission display device, and a light emitting diode (LED) as well as the transmissive or reflective electro-optical panel.

What is claimed is:

1. A liquid drop arranging device for arranging liquid drops made of liquid crystal on a substrate, the liquid drop arranging device comprising:
   a liquid drop discharge head moveable relative to the substrate in a scanning direction substantially parallel to a first edge of the substrate and in a sub-scanning direction substantially perpendicular to the scanning direction and substantially parallel to a second edge of the substrate; and
   a plurality of nozzles formed in the liquid drop discharge head along an axis;
   wherein the liquid drops are discharged from the liquid drop discharge head so that adjacent liquid drops reach the substrate with a pitch equal to or less than a diameter of the liquid drops immediately before the liquid drops reach the substrate; and
   wherein the adjacent liquid drops are connected to each other in the scanning direction and in the sub-scanning direction.

2. The liquid drop arranging device according to claim 1, wherein the liquid drop discharge head discharges the liquid drops in a straight line along the scanning direction such that the straight line connects centers of the liquid drops adjacent to each other are connected in the scanning direction and are connected in the sub-scanning direction.

3. The liquid drop arranging device according to claim 1, wherein the liquid drops are discharged from the plurality of nozzles in the sub-scanning direction with a first pitch;
   wherein a second pitch smaller than the first pitch is formed by rotating the liquid drop discharge head such that the axis of the plurality of nozzles is positioned at an angle relative to the scanning direction; and
   wherein the second pitch is set so as to correspond to the diameter of the liquid drops immediately before reaching the substrate, which changes in accordance with an amount or discharge speed of the liquid drops discharged from the liquid drop discharge head.

* * * * *